United States Patent
Ishii et al.

(10) Patent No.: US 10,409,301 B2
(45) Date of Patent: Sep. 10, 2019

(54) ELECTRONIC APPARATUS AND SURFACE TEMPERATURE CALCULATION METHOD

(71) Applicant: FUJITSU LIMITED, Kawasaki-shi, Kanagawa (JP)

(72) Inventors: Masatoshi Ishii, Kawasaki (JP); Yoshiyasu Nakashima, Kawasaki (JP); Hiroshi Nakao, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 169 days.

(21) Appl. No.: 15/289,223

(22) Filed: Oct. 10, 2016

(65) Prior Publication Data
US 2017/0147017 A1 May 25, 2017

(30) Foreign Application Priority Data
Nov. 24, 2015 (JP) ................... 2015-228644

(51) Int. Cl.
| G05D 23/19 | (2006.01) |
| G01K 7/42 | (2006.01) |
| G06F 1/20 | (2006.01) |
| G01K 7/22 | (2006.01) |

(52) U.S. Cl.
CPC .......... *G05D 23/1917* (2013.01); *G01K 7/427* (2013.01); *G05D 23/1928* (2013.01); *G06F 1/206* (2013.01); *G01K 7/22* (2013.01)

(58) Field of Classification Search
CPC ... G05D 23/1917; G05D 23/1928; G01K 7/22
USPC ....................................................... 700/299
See application file for complete search history.

(56) References Cited

U.S. PATENT DOCUMENTS

| 2011/0301777 | A1* | 12/2011 | Cox | ............ G06F 1/206 700/299 |
| 2011/0301778 | A1* | 12/2011 | Liang | ............ G05D 23/1932 700/299 |
| 2013/0321041 | A1* | 12/2013 | Kim | ............ H03K 3/011 327/113 |
| 2015/0177030 | A1* | 6/2015 | Vilim | ............ G01D 3/08 702/183 |

FOREIGN PATENT DOCUMENTS

| JP | 2010-101741 | 5/2010 |
| WO | 2012/049238 | 4/2012 |

* cited by examiner

*Primary Examiner* — Chun Cao
*Assistant Examiner* — Alan Chu
(74) *Attorney, Agent, or Firm* — Fujitsu Patent Center

(57) ABSTRACT

An electronic apparatus includes a housing; a substrate disposed on the inner side of the housing; a plurality of temperature sensors disposed on the substrate; and a processor. The processor performs a procedure including calculating heat source temperatures of a plurality of heat sources disposed on the substrate from temperatures measured by the temperature sensors by using a first heat transfer model not including a first parameter representing a transient response of heat transfer from the heat sources to the temperature sensors; and calculating a surface temperature of a surface of the housing from the heat source temperatures by using a second heat transfer model including the first parameter and a second parameter representing a transient response of heat transfer from the heat sources to the surface.

5 Claims, 19 Drawing Sheets

FIG. 9

INTERMEDIATE PARAMETER TABLE — 41

| PARAMETER NAME | VALUE |
|---|---|
| $h_{11}$ | 1.0 |
| $h_{12}$ | 0.6 |
| ⋮ | ⋮ |
| $h_{33}$ | 1.0 |
| $g_1$ | ~ |
| $\tau_{h1}$ | ~ |
| ⋮ | ⋮ |
| $\tau_{g13}$ | ~ |
| $\tau_{g23}$ | ~ |

FIG. 10

PARAMETER TABLE  42

| PARAMETER NAME | VALUE |
|---|---|
| $h^*_{11}$ | 3.89 |
| $h^*_{12}$ | −1.86 |
| ⋮ | ⋮ |
| $h^*_{33}$ | 2.57 |
| $a_{01}$ | ~ |
| $a_{11}$ | ~ |
| $a_{21}$ | ~ |
| ⋮ | ⋮ |
| $b_{13}$ | ~ |
| $b_{23}$ | ~ |

FIG. 12

PREVIOUS DATA TABLE ⟵ 43

| HEAT SOURCE | DATA NAME | VALUE |
|---|---|---|
| CPU | LAST-TIME RELATIVE TEMPERATURE | $T_{h1}(t-\Delta t) - T_{rt}(t-\Delta t)$ |
| | TIME-BEFORE-LAST RELATIVE TEMPERATURE | $T_{h1}(t-2\Delta t) - T_{rt}(t-2\Delta t)$ |
| | LAST-TIME ESTIMATED CONTRIBUTION | $T_{surf-1}(t-\Delta t)$ |
| | TIME-BEFORE-LAST ESTIMATED CONTRIBUTION | $T_{surf-1}(t-2\Delta t)$ |
| CHARGING CIRCUIT | LAST-TIME RELATIVE TEMPERATURE | $T_{h2}(t-\Delta t) - T_{rt}(t-\Delta t)$ |
| | TIME-BEFORE-LAST RELATIVE TEMPERATURE | $T_{h2}(t-2\Delta t) - T_{rt}(t-2\Delta t)$ |
| | LAST-TIME ESTIMATED CONTRIBUTION | $T_{surf-2}(t-\Delta t)$ |
| | TIME-BEFORE-LAST ESTIMATED CONTRIBUTION | $T_{surf-2}(t-2\Delta t)$ |
| POWER AMPLIFIER | LAST-TIME RELATIVE TEMPERATURE | $T_{h3}(t-\Delta t) - T_{rt}(t-\Delta t)$ |
| | TIME-BEFORE-LAST RELATIVE TEMPERATURE | $T_{h3}(t-2\Delta t) - T_{rt}(t-2\Delta t)$ |
| | LAST-TIME ESTIMATED CONTRIBUTION | $T_{surf-3}(t-\Delta t)$ |
| | TIME-BEFORE-LAST ESTIMATED CONTRIBUTION | $T_{surf-3}(t-2\Delta t)$ |

FIG. 15

CPU CONTROL TABLE  44

| LIMITATION STEP | CLOCK FREQUENCY |
|---|---|
| 0 | 2.0 GHz |
| 1 | 1.8 GHz |
| 2 | 1.6 GHz |
| 3 | 1.4 GHz |
| 4 | 1.2 GHz |
| 5 | 1.0 GHz |

ELECTRONIC APPARATUS AND SURFACE TEMPERATURE CALCULATION METHOD

CROSS-REFERENCE TO RELATED APPLICATION

This application is based upon and claims the benefit of priority of the prior Japanese Patent Application No. 2015-228644, filed on Nov. 24, 2015, the entire contents of which are incorporated herein by reference.

FIELD

The embodiments discussed herein are related to an electronic apparatus and surface temperature calculation method.

BACKGROUND

Today portable electronic apparatuses, such as smartphones and tablet terminals, are in widespread use and such electronic apparatuses increasingly provide enhanced multifunctionality and technical advantages. Along with multifunction and high-performance enhancement, processors, wireless interfaces, and other components used in an electronic apparatus generate an increased amount of heat. On the other hand, it is not easy to improve the cooling capacity of the electronic apparatus due to shape constraints. Therefore, long-time use of the components under high load results in insufficient cooling, which is likely to transfer heat from the components to the housing surface of the electronic apparatus, thus increasing the surface temperature.

When the surface temperature exceeds a threshold, it is preferable to reduce the surface temperature by controlling the operating level of components, for example, decreasing the operation speed of a processor and the transmission rate of a wireless interface. Due to shape constraints, however, it is sometimes difficult to dispose a temperature sensor for directly measuring the surface temperature near the housing surface. In view of the problem, some methods have been examined that indirectly estimate the surface temperature from other measured data, such as the internal temperature of the electronic apparatus.

For example, there has been proposed a handheld medical device that reduces the surface temperature by deactivating one or more components when an estimate of the surface temperature exceeds a threshold. The proposed handheld medical device measures the temperature at a plurality of internal locations using a plurality of temperature sensors and estimates the surface temperature based on the measured temperatures and a predetermined thermal model. In addition, the proposed handheld medical device measures the amount of power consumed by components of the handheld medical device. The handheld medical device then estimates the amount of heat generated by the components based on the measured power consumption and estimates the surface temperature based on the estimated amount of heat.

International Publication Pamphlet No. WO 2012/049238

Electronic apparatuses may have therein a plurality of components generating a large amount of heat, that is, a plurality of heat sources. In estimating the surface temperature of an electronic apparatus with a plurality of heat sources, it is preferable to measure the temperature at a plurality of internal locations using a plurality of temperature sensors in order to achieve higher estimation accuracy.

In this regard, how to estimate the surface temperature based on the measured temperatures obtained at the internal locations becomes a problem.

There is a delay when heat from a heat source is transferred to a temperature sensor or to the housing surface, and the delay depends on a heat transfer path (thermal path). Therefore, even if the heat source undergoes a rapid temperature change, the temperature measured by the temperature sensor and the surface temperature of the housing do not change rapidly, and transient response is observed under unsteady state conditions. For example, although the heat source undergoes a rapid increase in temperature, the surface temperature may be elevated slowly.

As a method to estimate the surface temperature with higher estimation accuracy, it may be considered appropriate to take account of transient responses in individual thermal paths from a plurality of heat sources to a plurality of temperature sensors and transient responses in individual thermal paths from the heat sources to the housing surface. One conceivable way to do this would be to calculate in advance values of a parameter (for example, the thermal time constant) representing the transient responses in the individual thermal paths and estimate the surface temperature using the parameter values and temperatures measured by the temperature sensors. However, rigorous representation of the transient responses using such a large number of parameter values involves significant computational effort to estimate the surface temperature. Especially, because the temperature measured by each temperature sensor is subject to the influence of a plurality of heat sources, the inverse calculation of the transient responses using the temperatures measured by a plurality of temperature sensors presents significant computational challenges.

SUMMARY

According to an aspect, there is provided an electronic apparatus including a housing; a substrate disposed on the inner side of the housing; a plurality of temperature sensors disposed on the substrate; and a processor. The processor performs a procedure including calculating heat source temperatures of a plurality of heat sources disposed on the substrate from temperatures measured by the temperature sensors by using a first heat transfer model not including a first parameter representing a transient response of heat transfer from the heat sources to the temperature sensors; and calculating a surface temperature of the surface of the housing from the heat source temperatures by using a second heat transfer model including the first parameter and a second parameter representing a transient response of heat transfer from the heat sources to the surface.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 illustrates an example of an intermediate parameter table;

FIG. 10 illustrates an example of a parameter table;

FIG. 12 illustrates an example of a previous data table;

FIG. 15 illustrates an example of a CPU control table;

DESCRIPTION OF EMBODIMENTS

Figure 1:
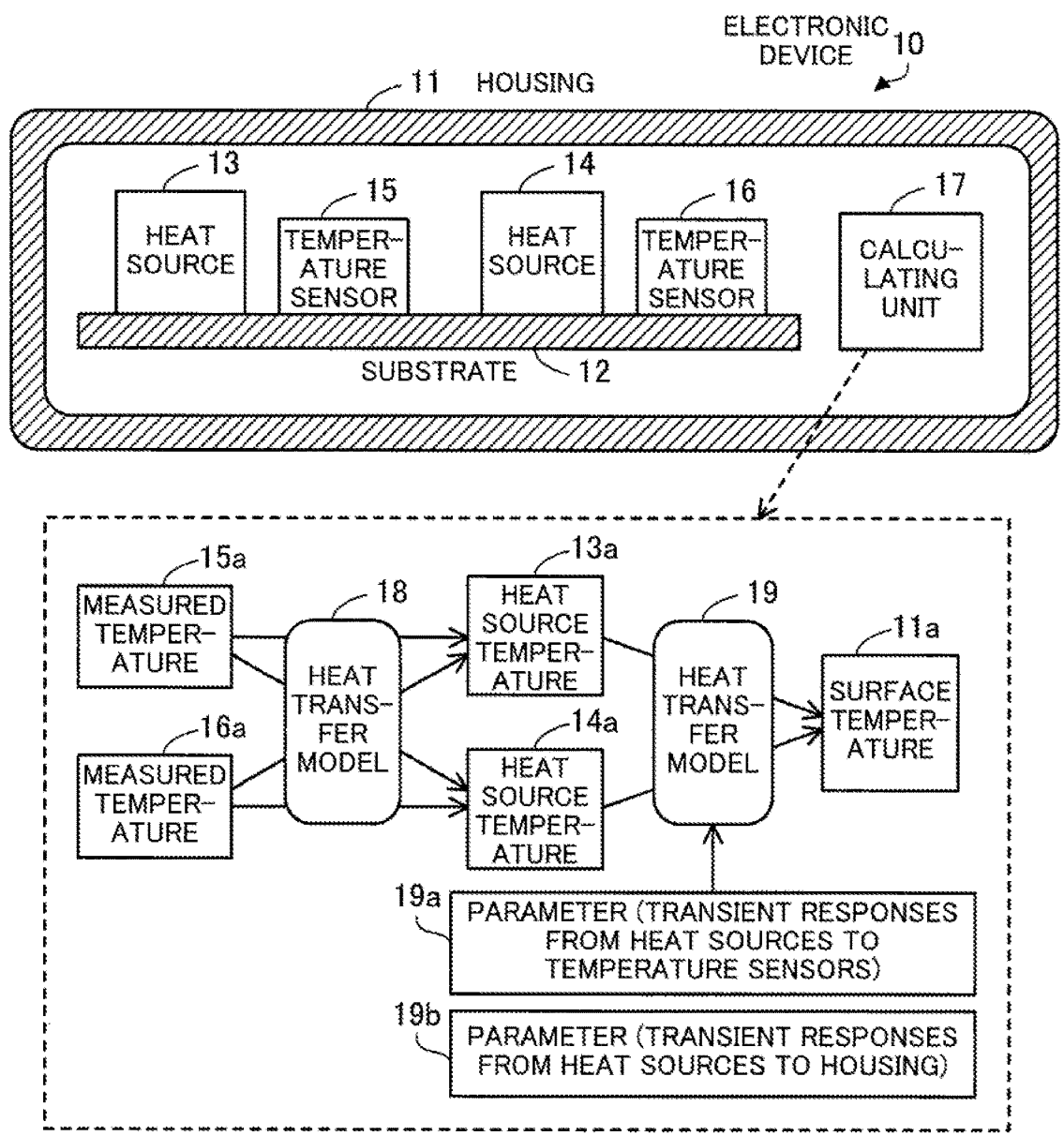
FIG. 1 illustrates an example of an electronic device according to a first embodiment.

Several embodiments will be described below with reference to the accompanying drawings, wherein like reference numerals refer to like elements throughout.

(a) First Embodiment

FIG. 1 illustrates an example of an electronic device according to a first embodiment. An electronic device 10 of the first embodiment is a device with the surface of which people come into contact. The electronic device 10 is a mobile terminal device, such as a smartphone, a mobile phone, a personal digital assistant (PDA), a tablet terminal, or a notebook computer. The electronic device 10 estimates the current surface temperature and controls its components to reduce the surface temperature (for example, decreases the processing speed of the components) if the surface temperature reaches high.

The electronic device 10 includes a housing 11, a substrate 12, a plurality of heat sources including heat sources 13 and 14, a plurality of temperature sensors including temperature sensors 15 and 16, and a calculating unit 17. The substrate 12 is disposed on the inner side of the housing 11. The heat sources 13 and 14 and the temperature sensors 15 and 16 are disposed on the substrate 12. The calculating unit 17 is disposed on the inner side of the housing 11, and may also be disposed on the substrate 12. According to FIG. 1, the calculating unit 17 is depicted separately from the heat sources 13 and 14; however, the calculating unit 17 may be one of the heat sources on the substrate 12.

The heat sources 13 and 14 are, amongst components of the electronic device 10, those generating a relatively large amount of heat. Examples of the heat sources 13 and 14 include a processor such as a central processing unit (CPU), a digital signal processor (DSP), or a graphics processing unit (GPU); a charging circuit; and a power amplifier of a wireless interface. FIG. 1 depicts two heat sources; however, the electronic device 10 may have three or more heat sources.

Each of the temperature sensors 15 and 16 is an electronic component for measuring the temperature at a location where the temperature sensor is disposed. The temperature sensors 15 and 16 are, for example, thermistors. FIG. 1 depicts two temperature sensors; however, the electronic device 10 may include three or more temperature sensors. The electronic device 10 is preferably provided with the number of temperature sensors equal to or more than that of the heat sources. Correspondences may be established between the plurality of heat sources and the plurality of temperature sensors on the substrates 12. For example, the temperature sensor 15 is associated with the heat source 13. In this case, the temperature sensor 15 is disposed at a location closer to the heat source 13 than to other heat sources. In addition, for example, the temperature sensor 16 is associated with the heat source 14. In this case, the temperature sensor 16 is disposed at a location closer to the heat source 14 than to other heat sources.

The calculating unit 17 estimates a surface temperature 11$a$ of a predetermined location on the surface of the housing 11 based on measured temperatures 15$a$ and 16$a$ detected by the temperature sensors 15 and 16, respectively. The calculating unit 17 is, for example, a processor such as a CPU or a DSP. The calculating unit 17 may include an electronic circuit designed for specific use, such as an application specific integrated circuit (ASIC) or a field programmable gate array (FPGA). The processor executes programs stored in memory such as random access memory (RAM). The programs include a surface temperature calculation program describing processes explained below. The term "processor" here may also mean a set of multiple processors (i.e., multiprocessor).

The calculating unit 17 acquires the measured temperature 15$a$ detected by the temperature sensor 15 and the measured temperature 16$a$ detected by the temperature sensor 16. Subsequently, using a predefined heat transfer model 18 (first heat transfer model), the calculating unit 17 calculates a heat source temperature 13$a$ of the heat source 13 and a heat source temperature 14$a$ of the heat source 14 from the measured temperatures 15$a$ and 16$a$. That is, the heat source temperatures 13$a$ and 14$a$ are not directly measured, but indirectly estimated. Then, using a predefined heat transfer model 19 (second heat transfer model), the calculating unit 17 calculates the surface temperature 11$a$ from the calculated heat source temperatures 13$a$ and 14$b$. That is, the surface temperature 11$a$ is not directly measured, but indirectly estimated. In the case of calculating the surface temperature 11$a$ of a different location on the surface of the housing 11, a different heat transfer model 19 may be used.

Note here that even if the amount of heat generated by the heat sources 13 and 14 changes rapidly, the surface temperature 11$a$ does not undergo a rapid change. It takes time for the changes in the amount of heat generation to finish affecting the surface temperature 11$a$, and the surface temperature 11$a$ changes gradually and transiently. That is, the surface temperature 11$a$ has a transient response under unsteady state conditions before reaching steady state. The transient response of heat transfer from the heat sources 13 and 14 to the surface of the housing 11 is determined, for example, using a time constant representing the response speed of the heat transfer. In like fashion, even if the amount of heat generated by the heat sources 13 and 14 changes rapidly, the measured temperatures 15$a$ and 16$a$ of the temperature sensors 15 and 16 do not undergo rapid changes. The measured temperatures 15a and 16a have a transient response under unsteady state conditions. The transient response of heat transfer from the heat sources 13 and 14 to the temperature sensors 15 and 16 on the substrate 12 is determined, for example, using a time constant representing the response speed of the heat transfer.

Note however that the substrate 12 includes wires offering high thermal conductivity (e.g. copper wires). For this reason, compared to the space between the substrate 12 and the housing 11, the components (i.e., the temperature sensors 15 and 16) in contact with the substrate 12 have relatively short delays in heat transfer and, therefore, have a relatively small time constant. In addition, the variation is small, among a plurality of temperature sensors, in the delay time until a change in the amount of heat generated by a given heat source is reflected in their measured temperatures. For example, in the case where the amount of heat generated by the heat source 13 increases, there is a small difference between the time delay until the measured temperature 15a stops rising and the time delay until the measured temperature 16a stops rising. Similarly, in the case where the amount of heat generated by the heat source 14 increases, there is a small difference between the time delay until the measured temperature 15a stops rising and the time delay until the measured temperature 16a stops rising.

In view of the above, when approximating the surface temperature 11a from the heat source temperatures 13a and 14a, the calculating unit 17 takes account of the transient response under unsteady state conditions. On the other hand, when calculating the heat source temperatures 13a and 14a from the measured temperatures 15a and 16a, the calculating unit 17 takes no account of the transient response based on the assumption of steady state. Specifically, the heat transfer model 18 does not include a parameter 19a (first parameter) representing the transient response on the substrate 12 from the heat sources 13 and 14 to the temperature sensors 15 and 16. On the other hand, the heat transfer model 19 includes the parameter 19a. Further, the heat transfer model 19 includes a parameter 19b (second parameter) representing the transient response from the heat sources 13 and 14 to the surface of the housing 11. The parameter 19a is, for example, a time constant representing the response speed which indicates how fast changes in the heat source temperatures 13a and 14a are reflected in the measured temperatures 15a and 16a. The parameter 19b is, for example, a time constant representing the response speed which indicates how fast changes in the heat source temperatures 13a and 14a are reflected in the surface temperature 11a. The values of the parameters 19a and 19b are stored in, for example, memory of the electronic device 10.

The use of the heat transfer model 18, which takes no account of the transient response on the grounds of the small variation in the response speed between the measured temperatures 15a and 16a, means estimating the heat source temperatures 13a and 14a for a predetermined time before the measured temperatures 15a and 16a were obtained. On the other hand, the use of the heat transfer model 19, which takes account of the transient response to the housing surface as well as the transient response on the substrate 12, means estimating the current surface temperature 11a in consideration of estimated delays of the heat source temperatures 13a and 14a.

Then, the calculating unit 17 controls the heat sources 13 and 14 based on the surface temperature 11a. For example, if the surface temperature 11a exceeds a predetermined threshold, the calculating unit 17 controls at least part of the operations of the heat sources 13 and 14 in such a manner as to reduce the surface temperature 11a. In the case where a given heat source is a processor, the calculating unit 17 may control the operation speed of the processor, for example, by lowering the upper limit of the operation speed. In the case where a given heat source is a charging circuit, the calculating unit 17 may intermittently stop the charging operation of the charging circuit. In the case where a given heat source is a wireless interface, the calculating unit 17 may control the transmission rate of the wireless interface, for example, by lowering the upper limit of the transmission rate. Using a plurality of the second heat transfer models, the calculating unit 17 is able to calculate the surface temperature of a plurality of locations across the surface of the housing 11. In that case, for example, the calculating unit 17 compares the highest value amongst the calculated temperatures with the predetermined threshold to thereby control the heat sources 13 and 14.

The electronic device 10 according to the first embodiment uses the heat transfer model 18, which does not include the parameter 19a representing the transient response from the heat sources 13 and 14 to the temperature sensors 15 and 16, to calculate the heat source temperatures 13a and 14a from the measured temperatures 15a and 16a. Subsequently, the electronic device 10 uses the heat transfer model 19, which includes the parameter 19a as well as the parameter 19b representing the transient response from the heat sources 13 and 14 to the surface of the housing 11, to calculate the surface temperature 11a from the heat source temperatures 13a and 14a.

If the transient response is taken into account in calculating the heat source temperature 13a and 14a from the measured temperatures 15a and 16a, the inverse calculation of the transient response presents significant computational challenges because each measured temperature is subject to the influence of a plurality of heat sources. On the other hand, the electronic device 10 does not take account of the transient response in approximating the heat source temperatures 13a and 14a from the measured temperatures 15a and 16a, to thereby reduce the computational effort, which in turn reduces the computational effort to estimate the surface temperature 11a. The reduction in the computational effort allows a reduction in the time needed to calculate the surface temperature 11a, which enables a reduction in the cycle period of calculating the surface temperature 11a. As a result, it is possible to obtain the latest surface temperature 11a of the housing 11 in a timely fashion, which contributes to improving the accuracy of controlling the heat sources 13 and 14.

(b) Second Embodiment

Figure 2:
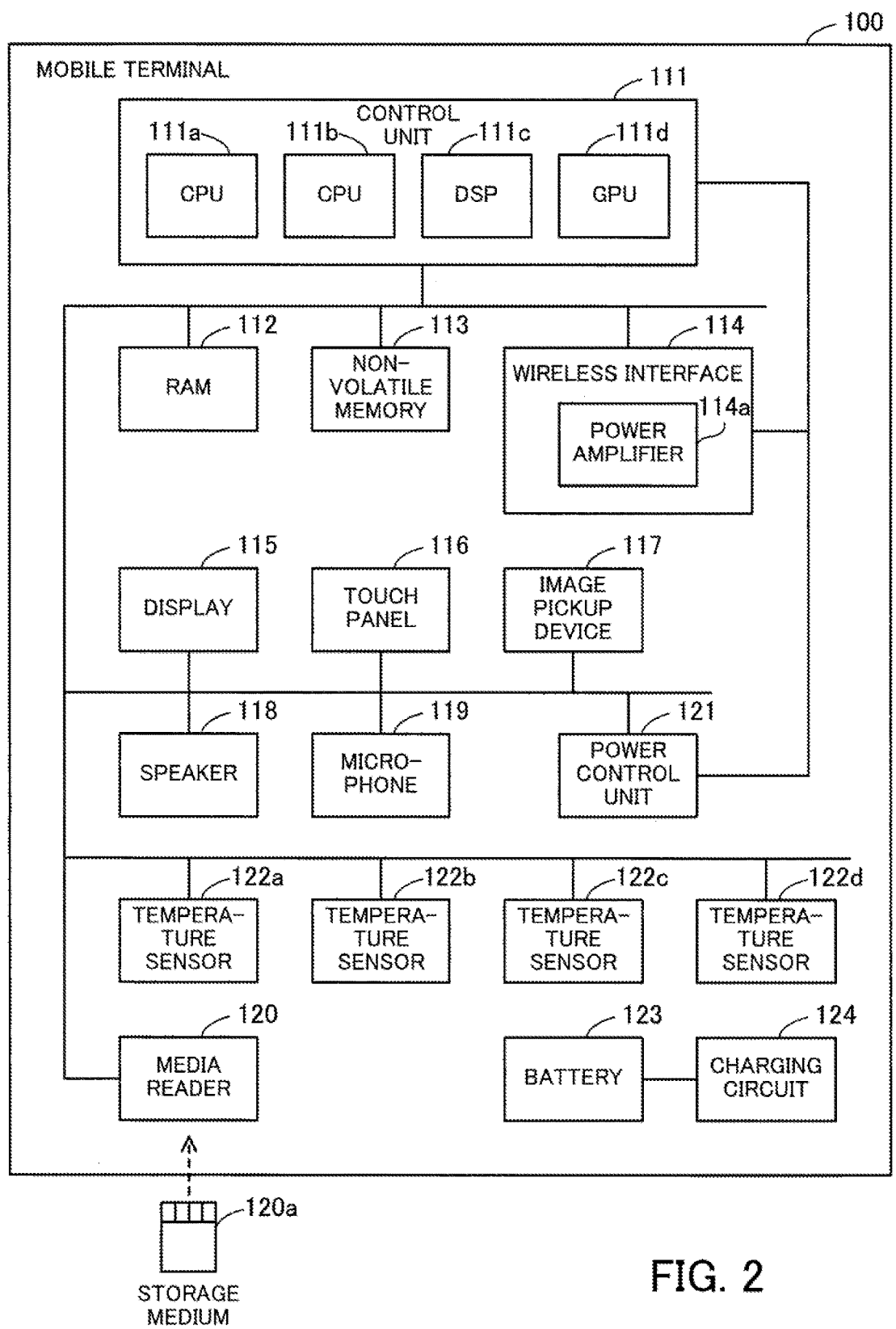
FIG. 2 is a block diagram illustrating an example of hardware of a mobile terminal.

FIG. 2 is a block diagram illustrating an example of hardware of a mobile terminal. A mobile terminal 100 of a second embodiment is a mobile terminal device with the surface of which its user comes into contact. The mobile terminal 100 is, for example, a smartphone, a mobile phone, a PDA, a tablet terminal, or a notebook computer. Note that the mobile terminal 100 corresponds to the electronic device 10 of the first embodiment.

The mobile terminal 100 includes a control unit 111, RAM 112, non-volatile memory 113, a wireless interface 114, a display 115, a touch panel 116, an image pickup device 117, a speaker 118, a microphone 119, and a media reader 120. The mobile terminal 100 also includes a power control unit 121, temperature sensors 122a, 122b, 122c, and 122d, a battery 123, and a charging circuit 124.

The control unit 111 controls the mobile terminal 100. The control unit 111 includes CPUs 111a and 111b, a DSP 111c, and a GPU 111d. Each of the CPUs 111a and 111b is a processor including a computing circuit for carrying out program instructions. The CPUs 111a and 111b load at least part of a program and data stored in the non-volatile memory 113 into the RAM 112 to execute the program. Note that the CPUs 111a and 111b may include a plurality of CPU cores. Processes of the second embodiment may be executed in parallel using the plurality of CPUs or CPU cores. The DSP 111c processes a digital signal. For example, the DSP 111c processes a transmission signal to be transmitted from the wireless interface 114 and a reception signal received by the wireless interface 114. In addition, the DSP 111c also processes an audio signal to be output to the speaker 118 and an audio signal input from the microphone 119. The GPU 111d processes an image signal. For example, the GPU 111d generates an image to be presented on the display 115.

The RAM 112 is volatile semiconductor memory for temporarily storing therein programs to be executed by the CPUs 111a and 111b and data to be used by the CPUs 111a and 111b for their computation. Note that the mobile terminal 100 may be provided with a different type of memory other than RAM, or may be provided with a plurality of memory devices. The non-volatile memory 113 is a non-volatile memory device for storing therein software programs, such as an operating system (OS), middleware, and application software, and various types of data. The programs include a surface temperature calculation program used to estimate the surface temperature of the mobile terminal 100. As the non-volatile memory 113, flash memory or a solid state drive (SSD), for example, is used. Note however that the mobile terminal 100 may be provided with a different type of non-volatile memory device, such as a hard disk drive (HDD).

The wireless interface 114 is a communication interface for communicating with a different communication device, such as a base station and an access point, via a wireless link. Note however that the mobile terminal 100 may be provided with a wired interface for communicating with a different communication device, such as a switch and a router, via a cable. The wireless interface 114 includes a power amplifier 114a for amplifying a transmission signal. The power amplifier 114a may be referred to as the high power amplifier (HPA), or simply the amplifier.

The display 115 presents an image according to an instruction from the control unit 111. A liquid crystal display (LCD) or an organic electro-luminescence (OEL) display, for example, is used as the display 115. The touch panel 116 is placed over the display 115. The touch panel 116 detects a touch operation of the user on the display 115. The touch panel 116 detects a point of touch of a finger or stylus to the display surface and gives the control unit 111 notice of the detected point. There are various systems for recognizing and locating the touch point and any one of the following may be adopted: a matrix switch system; a resistive touch system; a surface acoustic wave system; an infrared system; an electromagnetic induction system; and a capacitance system. Note however that the mobile terminal 100 may be provided with a different input device, such as a keypad. For example, the keypad is provided with one or two or more input keys. The keypad detects presses on input keys by the user and gives the control unit 111 notice of the pressed input keys.

The image pickup device 117 captures a static or moving image. A charge coupled device (CCD) sensor or complementary metal oxide semiconductor (CMOS) sensor, for example, is used as an image sensor. The image pickup device 117 stores, in the RAM 112 or the non-volatile memory 113, image data representing a captured image. The speaker 118 acquires an electrical signal as an audio signal from the control unit 111, and converts the electrical signal into a physical signal to thereby reproduce a sound. For example, when the user is talking on the phone, the voice of a person on the other end of the phone and background noise are reproduced. The microphone 119 converts a physical signal of sound into an electrical signal and outputs the electrical signal as an audio signal to the control unit 111. For example, when the user is talking on the phone, the voice of the user and background noise are input from the microphone 119.

The media reader 120 is a reader for reading programs and data recorded in a storage medium 120a. As the storage medium 120a, any of the following may be used: a magnetic disk, such as flash memory, a flexible disk (FD), or HDD; an optical disk, such as a compact disc (CD) or digital versatile disc (DVD); and a magneto-optical disk (MO). The media reader 120 stores programs and data read from the storage medium 120a, for example, in the RAM 112 or the non-volatile memory 113.

The power control unit 121 changes the operating level of the control unit 111 and the wireless interface 114 to thereby control power consumption of the control unit 111 and the wireless interface 114. When the operating level is higher, the power consumption increases and a larger amount of heat is generated. For example, the power control unit 121 changes the clock frequencies of the CPUs 111a and 111b. When the clock frequencies are higher, the CPUs 111a and 111b provide higher computing power, and consume more power and generate more heat. In addition, for example, the power control unit 121 changes the transmission rate of the wireless interface 114. When the transmission rate is higher, the power amplifier 114a consumes more power and generates more heat.

Each of the temperature sensors 122a, 122b, 122c, and 122d measures the temperature at a location where the temperature sensor is disposed. Thermistors, for example, are used as the temperature sensors 122a, 122b, 122c, and 122d. The temperature sensor 122a is disposed close to the CPU 111a. The temperature sensor 122b is disposed close to the charging circuit 124. The temperature sensor 122c is disposed close to the power amplifier 114a. The temperature sensor 122d is disposed close to the battery 123. The temperature sensors 122a, 122b, 122c, and 122d notify the control unit 111 of the measured temperatures.

The battery 123 is a secondary battery capable of repeating charge and discharge. The battery 123 stores electrical energy through the charging circuit 124. The battery 123 supplies the stored electrical energy to components of the mobile terminal 100. For example, the battery 123 supplies electrical energy to the CPUs 111a and 111b and the wireless interface 114. The charging circuit 124 acquires electrical energy from an external power supply located outside the mobile terminal 100 and charges the battery 123 with electrical energy. The charging through the charging circuit 124 is implemented when the mobile terminal 100 is connected to the external power supply.

Because the user is likely to touch the surface of the mobile terminal 100, it is preferable that the surface temperature of the mobile terminal 100 does not reach too high. Therefore, the mobile terminal 100 estimates the surface temperature using the temperature sensors 122a, 122b, 122c, and 122d. If the estimated surface temperature exceeds a threshold, the mobile terminal 100 lowers the operating level of the components to thereby reduce the surface temperature. Estimation equations used to estimate the surface temperature are generated in advance by a design device and then stored in the mobile terminal 100.

Figure 3:
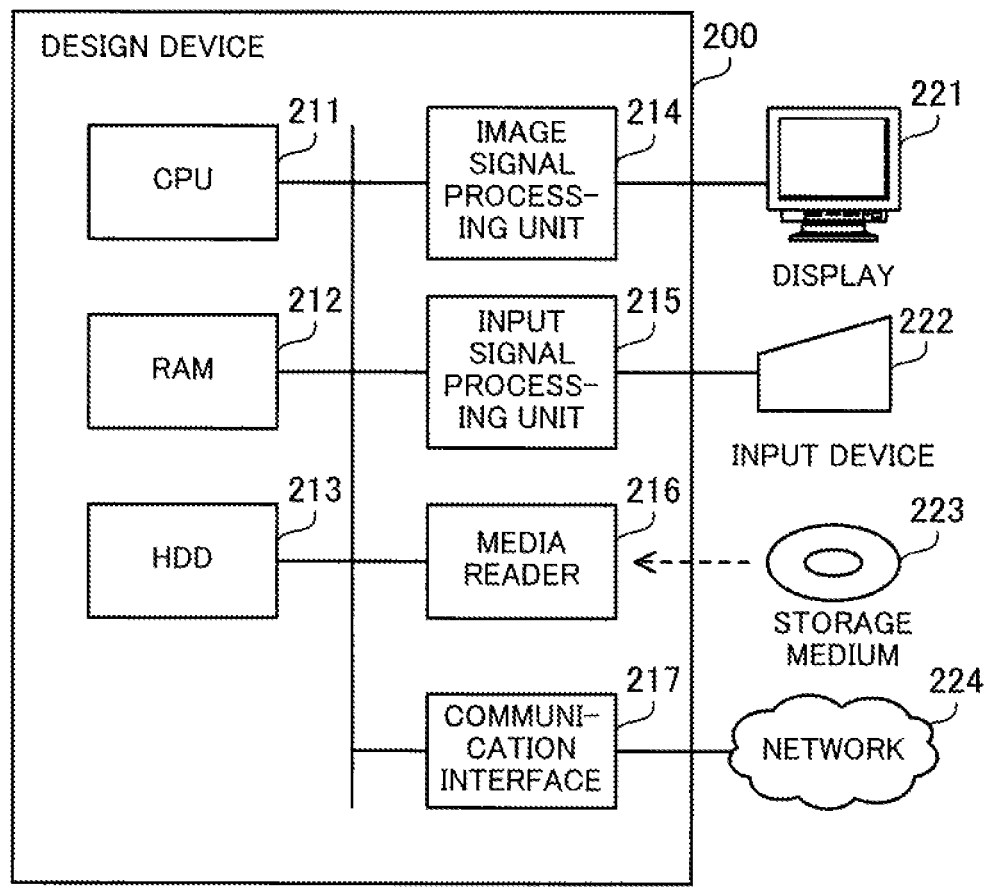
FIG. 3 is a block diagram illustrating an example of hardware of a design device.

FIG. 3 is a block diagram illustrating an example of hardware of the design device. A design device 200 of a second embodiment generates estimation equations used to estimate the surface temperature of the mobile terminal 100. The estimation equations generated by the design device 200 are stored in advance in the non-volatile memory 113 of the mobile terminal 100. Note however that the estimation equations may be sent to the mobile terminal 100 from the design device 200 or a different device via a network. The design device 200 may be a client device, such as a client computer, operated by its user, or a server device such as a server computer. The design device 200 includes a CPU 211, RAM 212, a HDD 213, an image signal processing unit 214, an input signal processing unit 215, a media reader 216, and a communication interface 217.

The CPU 211 is a processor including a computing circuit for carrying out program instructions. The CPU 211 loads at least part of a program and data stored in the HDD 213 into the RAM 212 to execute the program. The RAM 212 is volatile semiconductor memory for temporarily storing therein programs to be executed by the CPU 211 and data to be used by the CPU 211 for its computation. The HDD 213 is a non-volatile memory device to store therein software programs, such as an operating system, middleware, and application software, and various types of data. Note that the design device 200 may be provided with a different type of memory device, such as flash memory or a SSD.

The image signal processing unit 214 outputs an image to a display 221 connected to the design device 200 according to an instruction from the CPU 211. The input signal processing unit 215 acquires an input signal from an input device 222 connected to the design device 200 and sends the input signal to the CPU 211. Various types of input devices including the following may be used as the input device 222: a pointing device, such as a mouse, touch panel, and touch-pad; a keyboard; a remote controller; and a button switch. In addition, a plurality of types of input devices may be connected to the design device 200.

The media reader 216 is a reader for reading programs and data recorded in a storage medium 223. As the storage medium 223, any of the following may be used: a magnetic disk, such as a flexible disk or HDD; an optical disk, such as a compact disc or DVD; a magneto-optical disk; and semiconductor memory. The media reader 216 stores programs and data read from the storage medium 223, for example, in the RAM 212 or the HDD 213.

The communication interface 217 is connected to a network 224 and communicates with other devices via the network 224. The communication interface 217 may be a wired communication interface connected via a cable to a communication apparatus, such as a switch, or a wireless communication interface connected via a wireless link to a base station.

Figure 4:
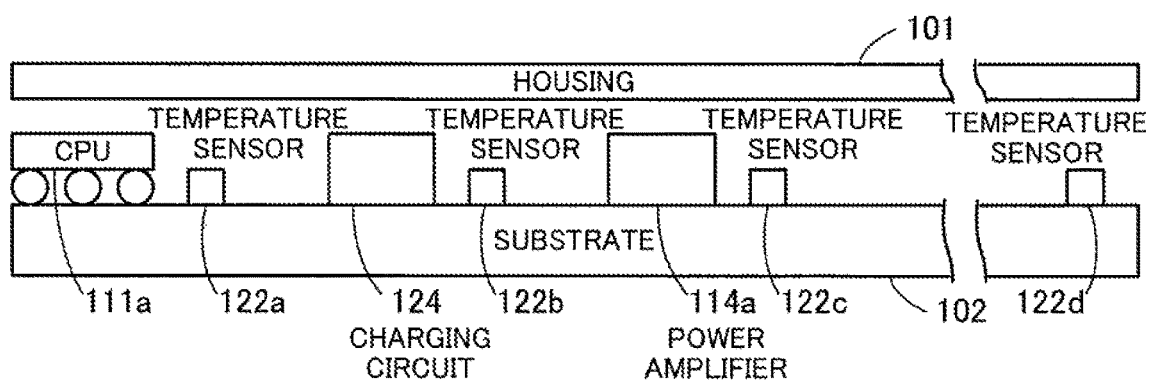
FIG. 4 illustrates an example of disposition of heat sources and temperature sensors.

Next described is heat transfer in the mobile terminal 100. FIG. 4 illustrates an example of disposition of the heat sources and temperature sensors. The mobile terminal 100 includes a housing 101 and a substrate 102. The housing 101 surrounds components of the mobile terminal 100. The outer side of the housing 101 is likely to come in contact with the user. The substrate 102 is disposed inside the housing 101. On the substrate 102, at least some of the components of the mobile terminal 100 are disposed. Wires (e.g. copper wires) for electrically connecting two or more components are disposed in the substrate 102.

The CPU 111a, the charging circuit 124, and the power amplifier 114a are disposed on the substrate 102. The CPU 111a, the charging circuit 124, and the power amplifier 114a are components generating a relatively large amount of heat and are therefore regarded as heat sources. The temperature sensors 122a, 122b, and 122c are disposed on the substrate 102, in one-to-one correspondence with these heat sources. The temperature sensor 122a is located closest to the CPU 111a amongst the heat sources. The temperature sensor 122b is located closest to the charging circuit 124 amongst the heat sources. The temperature sensor 122c is located closest to the power amplifier 114a amongst the heat sources.

In addition, the mobile terminal 100 includes the temperature sensor 122d for measuring a reference point temperature. Compared to the temperature sensors 122a, 122b, and 122c, the temperature sensor 122d is sufficiently distant from the CPU 111a, the charging circuit 124, and the power amplifier 114a acting as heat sources. Note that the delay time until a temperature change of each of the heat sources affects the temperature measured by the temperature sensor 122d is sufficiently longer than the delay time until the temperature change affects the temperature measured by each of the temperature sensors 122a, 122b, and 122c. That is, the thermal time constant (to be described later) of the temperature sensor 122d is sufficiently longer than those of the temperature sensors 122a, 122b, and 122c. The temperature sensor 122d may be disposed on the substrate 102, or at a place other than the substrate 102. By way of example, the temperature sensor 122d is disposed close to the battery 123 according to the second embodiment.

The heat of the CPU 111a is transferred to the temperature sensors 122a, 122b, and 122c via the substrate 102. Note however that, because the temperature sensor 122a is closest to the CPU 111a, the heat of the CPU 111a most greatly affects the temperature to be measured by the temperature sensor 122a. In like fashion, the heat of the charging circuit 124 is transferred to the temperature sensors 122a, 122b, and 122c. However, because the temperature sensor 122b is closest to the charging circuit 124, the heat of the charging circuit 124 most greatly affects the temperature to be measured by the temperature sensor 122b. The heat of the power amplifier 114a is transferred to the temperature sensors 122a, 122b, and 122c via the substrate 102. However, because the temperature sensor 122c is closest to the power amplifier 114a, the heat of the power amplifier 114a most greatly affects the temperature to be measured by the temperature sensor 122c.

In addition, the heat of the CPU 111a, the charging circuit 124, and the power amplifier 114a is transferred to the surface of the housing 101 via physical objects or space existing between the substrate 102 and the housing 101. A location across the surface of the housing 101, whose surface temperature reaches its maximum depends on a combination of the amount of heat generated by each of the CPU 111a, the charging circuit 124, and the power amplifier 114a. Therefore, the location with the maximum surface temperature is not fixed but varies depending on the usage of the components.

Note that the CPU 111a corresponds to the heat source 13 of the first embodiment. The charging circuit 124 corresponds to the heat source 14 of the first embodiment. The temperature sensors 122a and 122b correspond to the temperature sensors 15 and 16 of the first embodiment.

Now let us consider first a heat transfer model where there is only one heat source on the substrate 102. Assume here that the CPU 111a is the only heat source while the amount of heat generated by the charging circuit 124 and the power amplifier 114a is negligibly small. The heat of the CPU 111a acting as a heat source is transferred to the temperature sensor 122a. Because the heat is gradually transferred from the CPU 111a to the temperature sensor 122a, the temperature measured by the temperature sensor 122a has a transient response under unsteady state conditions. In addition, the heat of the CPU 111a is transferred to the surface of the housing 101. Because the heat is gradually transferred from the CPU 111a to the surface of the housing 101, the surface temperature of the housing 101 has a transient response under unsteady state conditions. The heat transfer model considered here takes account of both the transient response from the CPU 111a to the temperature sensor 122a and the transient response from the CPU 111a to the housing 101.

The measured temperature of the temperature sensor 122a is defined by the following Expression (1). $T_{sensor1}(s)$ is obtained by converting, using the Laplace transform, a relative temperature of the temperature sensor 122a into the frequency domain. The relative temperature of the temperature sensor 122a is calculated by subtracting the measured temperature of the temperature sensor 122d (i.e., the reference point temperature) from the measured temperature of the temperature sensor 122a. Hereinafter, variables in the time and frequency domains are sometimes denoted by "t" and "s", respectively. $T_{cpu}(s)$ is obtained by taking the Laplace transform of the relative temperature of the CPU 111a. H(s) is the transfer function in the frequency domain for converting the relative temperature of the CPU 111a to the relative temperature of the temperature sensor 122d. The transfer function H(s) takes account of the transient response, and includes h and $\tau_h$ as parameters. h is the heat transfer coefficient and $\tau_h$ is the thermal time constant. The values of h and $\tau_h$ are calculated in advance using the design device 200. For example, h=0.500 and $\tau_h$=40.

$$T_{sensor1}(s) = H(s)T_{cpu}(s) \text{ where } H(s) = \frac{h}{1+s\tau_h} \quad (1)$$

Figure 5:
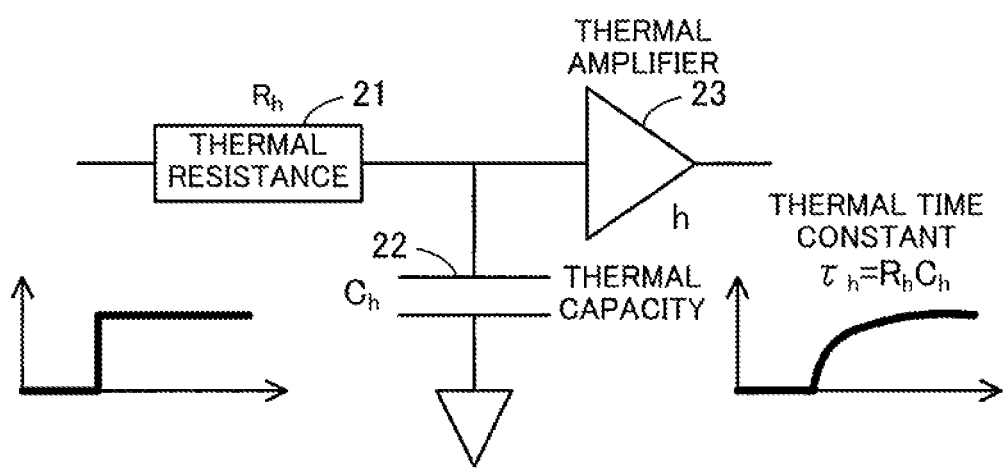
FIG. 5 illustrates an example of a thermal circuit model representing a transient response of heat transfer.

FIG. 5 illustrates an example of a thermal circuit model representing a transient response of heat transfer. The transfer function H(s) is derived from the thermal circuit model of FIG. 5. The thermal circuit model is considered to exist between the CPU 111a and the temperature sensor 122a. The thermal circuit model includes thermal resistance 21, thermal capacity 22, and a thermal amplifier 23. The amount of the thermal resistance 21 is denoted by $R_h$, and the amount of the thermal capacity is denoted by $C_h$. The thermal time constant $\tau_h$ is obtained as the product of $R_h$ and $C_h$. The amplification factor of the thermal amplifier 23 is denoted by h. The input to the thermal resistance 21 is the input to the thermal circuit model. The output from the thermal resistance 21 is connected to the input to the thermal capacity 22 and the input to the thermal amplifier 23. The output from the thermal capacity 22 is connected to ground or earth. The output from the thermal amplifier 23 is the output from the thermal circuit model.

Assume here that the input to the thermal resistance 21 has undergone a rapid change from "0" to "1". In response, the output from the thermal amplifier 23 changes from "0" to "h". Note however that the output from the thermal amplifier 23 changes not rapidly but gradually from "0" toward "h". The delay time from when the output from the thermal amplifier 23 begins to change until the output sufficiently approaches "h" is the thermal time constant $\tau_h$. Therefore, the measured temperature of the temperature sensor 122a becomes higher when the heat transfer coefficient h takes a larger value, and becomes lower when the heat transfer coefficient h takes a smaller value. In addition, following a change in the amount of heat generated by the CPU 111a, the measured temperature of the temperature sensor 122a undergoes a faster change when the thermal time constant $\tau_h$ takes a smaller value, and it undergoes a slower change when the thermal time constant $\tau_h$ takes a larger value.

As for heat transfer from the CPU 111a to the housing 101 also, it is possible to model the heat transfer using a thermal circuit model similar to that representing the heat transfer from the CPU 111a to the temperature sensor 122a. Note however that the values of parameters, such as the heat transfer coefficient and the thermal time constant, are different between the former and the latter models.

The surface temperature of the housing 101 is defined by the following Expression (2). $T_{surface}(s)$ is obtained by converting, using the Laplace transform, a relative temperature of the housing 101 in relation to the reference point temperature into the frequency domain. $T_{cpu}(s)$ is obtained by taking the Laplace transform of the relative temperature of the CPU 111a. G(s) is the transfer function in the frequency domain for converting the relative temperature of the CPU 111a to the relative temperature of the housing 101. The transfer function G(s) takes account of the transient response, and includes g and $\tau_g$ as parameters. g is the heat transfer coefficient and $\tau_g$ is the thermal time constant. The values of g and $\tau_g$ are calculated in advance using the design device 200. For example, g=0.425 and $\tau_h$=85.

$$T_{surface}(s) = G(s)T_{cpu}(s) \text{ where } G(s) = \frac{g}{1+s\tau_g} \quad (2)$$

The surface temperature of the housing 101 is defined by the following Expression (3) derived from Expressions (1) and (2) above. $T_{surface}(s)$ in Expression (3) is the relative temperature of the housing 101 in the frequency domain. Therefore, the surface temperature of the housing 101 at a given point in time is defined by the following Expression (4) using the inverse Laplace transform. $T_{surface}(t)$ is the surface temperature of the housing 101 as of time t. $T_{sensor2}(t)$ is the reference point temperature as of time t, measured by the temperature sensor 122d. $T_{surface}(t)$ is calculated by adding $T_{sensor2}(t)$ to a value obtained by taking the inverse Laplace transform of $T_{surface}(s)$.

$$T_{surface}(s) = \frac{G(s)}{H(s)} T_{sensor1}(s) = \frac{g}{h} \frac{1+s\tau_h}{1+s\tau_g} T_{sensor1}(s) \quad (3)$$

$$T_{surface}(t) = \mathcal{L}^{-1}\left(\frac{g}{h} \frac{1+s\tau_h}{1+s\tau_g} T_{sensor1}(s)\right) + T_{sensor2}(t) \quad (4)$$

By expanding the Laplace transform into a difference equation, Expression (4) is converted to the following Expression (5). The first term of the right side of Expression (5) concerns the subtraction of the reference point temperature from the measured temperature of the temperature sensor 122a, which yields the relative temperature of the temperature sensor 122a. The second term of the right side concerns the subtraction of the reference point temperature a predetermined the time Δt ago from the measured temperature of the temperature sensor 122a the time Δt ago, which yields the relative temperature of the temperature sensor 122a the time Δt ago. Δt is the measurement cycle period, and about 10 seconds, for example. t−Δt means the last measurement time point.

$$T_{surface}(t) = \qquad (5)$$
$$a_0(T_{sensor1}(t) - T_{sensor2}(t)) + a_1(T_{sensor1}(t - \Delta t) - T_{sensor2}(t - \Delta t)) -$$
$$b_1(T_{surface}(t - \Delta t) - T_{sensor2}(t - \Delta t)) + T_{sensor2}(t)$$
$$\text{where } a_0 = \frac{g}{h}\frac{\Delta t + 2\tau_h}{\Delta t + 2\tau_g} \quad a_1 = \frac{g}{h}\frac{\Delta t - 2\tau_h}{\Delta t + 2\tau_g} \quad b_1 = \frac{g}{h}\frac{\Delta t - 2\tau_g}{\Delta t + 2\tau_g}$$

The third term of the right side concerns the subtraction of the reference point temperature the time Δt ago from the surface temperature of the housing 101 the time Δt ago, which yields the relative temperature of the housing 101 the time Δt ago. The fourth term of the right side concerns the reference point temperature measured by the temperature sensor 122d. The first term includes the multiplication of a coefficient $a_0$. The second term includes the multiplication of a coefficient $a_1$. The third term includes the multiplication of a coefficient $b_1$. The coefficients $a_0$, $a_1$, and $b_1$ are defined as given in Expression (5), using h, g, $\tau_h$, and $\tau_g$. In the above described manner, the surface temperature of the housing 101 is estimated using the measured temperatures of the temperature sensors 122a and 122d, the last-time measured temperatures of the temperature sensors 122a and 122d, and the last-time estimate of the surface temperature of the housing 101.

Figure 6:
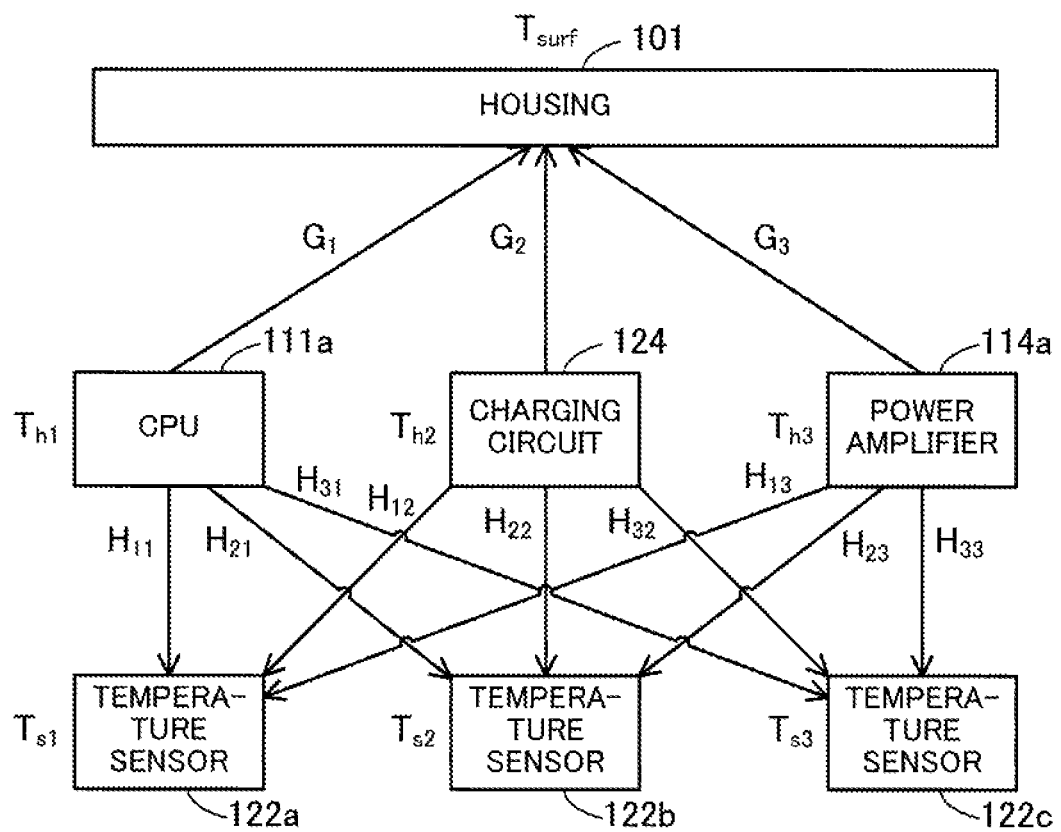
FIG. 6 illustrates an example of heat transfer from a plurality of heat sources.

Next, an attempt is made to extend the above-described heat transfer model to the case where a plurality of heat sources are present. FIG. 6 illustrates an example of heat transfer from a plurality of heat sources. The value obtained by taking the Laplace transform of the relative temperature of the CPU 111a is denoted by $T_{h1}(s)$. The heat of the CPU 111a transferred to the temperature sensor 122a is represented by a transfer function $H_{11}(s)$. The heat of the CPU 111a transferred to the temperature sensor 122b is represented by a transfer function $H_{21}(s)$. The heat of the CPU 111a transferred to the temperature sensor 122c is represented by a transfer function $H_{31}(s)$. Similarly, the value obtained by taking the Laplace transform of the relative temperature of the charging circuit 124 is denoted by $T_{h2}(s)$. The heat of the charging circuit 124 transferred to the temperature sensor 122a is represented by a transfer function $H_{12}(s)$. The heat of the charging circuit 124 transferred to the temperature sensor 122b is represented by a transfer function $H_{22}(s)$. The heat of the charging circuit 124 transferred to the temperature sensor 122c is represented by a transfer function $H_{32}(s)$. The value obtained by taking the Laplace transform of the relative temperature of the power amplifier 114a is denoted by $T_{h3}(s)$. The heat of the power amplifier 114a transferred to the temperature sensor 122a is represented by a transfer function $H_{13}(s)$. The heat of the power amplifier 114a transferred to the temperature sensor 122b is represented by a transfer function $H_{23}(s)$. The heat of the power amplifier 114a transferred to the temperature sensor 122c is represented by a transfer function $H_{33}(s)$.

The value obtained by taking the Laplace transform of the relative temperature of the temperature sensor 122a is denoted by $T_{s1}(s)$. $T_{s1}(s)$ is a combination of the contributions from the CPU 111a, the charging circuit 124, and the power amplifier 114a. Therefore, $T_{s1}(s)$ is defined by the following Expression (6). $H_{ij}(s)$ is the transfer function representing heat transfer from the $j^{th}$ heat source to the $i^{th}$ temperature sensor. $h_{ij}$ is the heat transfer coefficient for heat transfer from the $j^{th}$ heat source to the $i^{th}$ temperature sensor, and $\tau_{hij}$ is the thermal time constant for heat transfer from the $j^{th}$ heat source to the $i^{th}$ temperature sensor. The values of $h_{ij}$ and $\tau_{hij}$ are calculated in advance using the design device 200.

$$T_{s1}(s) = H_{11}(s)T_{h1}(s) + H_{12}T_{h2}(s) + H_{13}(s)T_{h3}(s) \qquad (6)$$
$$\text{where } H_{ij}(s) = \frac{h_{ij}}{1 + s\tau_{hij}}$$

In like fashion, the value obtained by taking the Laplace transform of the relative temperature of the temperature sensor 122b is denoted by $T_{s2}(s)$. $T_{s2}(s)$ is a combination of the contributions from the CPU 111a, the charging circuit 124, and the power amplifier 114a. The value obtained by taking the Laplace transform of the relative temperature of the temperature sensor 122c is denoted by $T_{s3}(s)$. $T_{s3}(s)$ is a combination of the contributions from the CPU 111a, the charging circuit 124, and the power amplifier 114a. Therefore, $T_{s1}(s)$, $T_{s2}(s)$, and $T_{s3}(s)$ are expressed in matrix form as given in the following Expression (7). A matrix H is the matrix of transfer functions. The element in the $i^{th}$ row and $j^{th}$ column of the matrix H is $H_{ij}(s)$, representing the heat transfer from the $j^{th}$ heat source to the $i^{th}$ temperature sensor.

$$\begin{bmatrix} T_{s1}(s) \\ T_{s2}(s) \\ T_{s3}(s) \end{bmatrix} = H \begin{bmatrix} T_{h1}(s) \\ T_{h2}(s) \\ T_{h3}(s) \end{bmatrix} = \begin{bmatrix} H_{11}(s) & H_{12}(s) & H_{13}(s) \\ H_{21}(s) & H_{22}(s) & H_{23}(s) \\ H_{31}(s) & H_{32}(s) & H_{33}(s) \end{bmatrix} \begin{bmatrix} T_{h1}(s) \\ T_{h2}(s) \\ T_{h3}(s) \end{bmatrix} \qquad (7)$$

In addition, the heat of the CPU 111a transferred to the surface of the housing 101 is represented by a transfer function $G_1(s)$. The heat of the charging circuit 124 transferred to the surface of the housing 101 is represented by a transfer function $G_2(s)$. The heat of the power amplifier 114a transferred to the surface of the housing 101 is represented by a transfer function $G_3(s)$.

The value obtained by taking the Laplace transform of the relative temperature of the surface of the housing 101 is denoted by $T_{surf}(s)$. $T_{surf}(s)$ is a combination of the contributions from the CPU 111a, the charging circuit 124, and the power amplifier 114a. Therefore, $T_{surf}(s)$ is defined by the following Expression (8). $G_i(s)$ is the transfer function representing heat transfer from the $i^{th}$ heat source to the housing 101. $g_i$ is the heat transfer coefficient for heat transfer from the $i^{th}$ heat source to the housing 101, and $\tau_{g1i}$ and $\tau_{g2i}$ are the thermal time constants for heat transfer from the $i^{th}$ heat source to the housing 101. In Expression (8), each transfer function contains two thermal time constants. This achieves a higher accuracy in estimating $T_{surf}(s)$ when a plurality of physical objects made of different materials are present between the substrate 102 and the housing 101. The values of $g_i$, $\tau_{g1i}$, and $\tau_{g2i}$ are calculated in advance using the design device 200.

$$T_{surf}(s) = G_1(s)T_{h1}(s) + G_2(s)T_{h2}(s) + G_3(s)T_{h3}(s) \qquad (8)$$
$$\text{where } G_i(s) = \frac{g_i}{(1 + s\tau_{g1i})(1 + s\tau_{g2i})}$$

Expression (8) may also be expressed in matrix form. When $T_{h1}(s)$, $T_{h2}(s)$, and $T_{h3}(s)$ are expanded by using Expression (7), $T_{surf}(s)$ is expressed as the product of $G_i(s)$, the inverse matrix of H, and $T_{sj}(s)$ as given in the following Expression (9). That is, the relative temperatures of the CPU 111a, the charging circuit 124, and the power amplifier 114a are estimated based on the relative temperatures of the temperature sensors 122a, 122b, and 122c and the inverse matrix of H. Then, the surface temperature of the housing 101 is estimated based on the relative temperatures of the CPU 111a, the charging circuit 124, and the power amplifier 114a and $G_1(s)$, $G_2(s)$, and $G_3(s)$.

$$T_{surf}(s) = \begin{bmatrix} G_1(s) \\ G_2(s) \\ G_3(s) \end{bmatrix}^T \begin{bmatrix} T_{h1}(s) \\ T_{h2}(s) \\ T_{h3}(s) \end{bmatrix} = \begin{bmatrix} G_1(s) \\ G_2(s) \\ G_3(s) \end{bmatrix}^T H^{-1} \begin{bmatrix} T_{s1}(s) \\ T_{s2}(s) \\ T_{s3}(s) \end{bmatrix} \quad (9)$$

The inverse matrix of H is defined by the following Expression (10). Note however that the argument s of each transfer function is omitted in Expression (10). $\Delta$ is an eigenvalue defined as: $\Delta=(H_{11}H_{22}-H_{12}H_{21})H_{33}+(H_{13}H_{21}-H_{11}H_{23})H_{32}+(H_{12}H_{23}-H_{13}H_{22})H_{31}$.

$$H^{-1} = \frac{1}{\Delta} \begin{bmatrix} H_{22}H_{33}-H_{23}H_{32} & H_{13}H_{32}-H_{12}H_{33} & H_{12}H_{23}-H_{13}H_{22} \\ H_{23}H_{31}-H_{21}H_{33} & H_{11}H_{33}-H_{13}H_{31} & H_{11}H_{23}-H_{13}H_{21} \\ H_{21}H_{32}-H_{22}H_{31} & H_{12}H_{31}-H_{11}H_{32} & H_{11}H_{22}-H_{12}H_{21} \end{bmatrix} \quad (10)$$

Note that each transfer function $H_{ij}(s)$ in Expression (10) includes the thermal time constant $\tau_{hij}$. Therefore, the multiplication of the inverse matrix of H and the relative temperatures of the temperature sensors 122a, 122b, and 122c involves considerable computational effort, causing too much load on the mobile terminal 100. To calculate $T_{surf}(s)$ according to Expression (9), sexstic filter calculation (i.e., filter calculation of degree six) is performed nine times. In general, when n pairs (n is an integer equal to 2 or greater) of a heat source and a temperature sensor are present, filter calculation of degree 2n is performed $n^2$ times.

In view of the above problem, the mobile terminal 100 approximates $T_{surf}(s)$ by a method involving low computational effort according to the second embodiment. Specifically, in estimating the heat source temperatures of the CPU 111a, the charging circuit 124, and the power amplifier 114a from the measured temperatures of the temperature sensors 122a, 122b, and 122c, the mobile terminal 100 uses transfer functions taking no account of the transient responses on the substrate 102. On the other hand, in estimating the surface temperature of the housing 101 from the heat source temperatures of the CPU 111a, the charging circuit 124, and the power amplifier 114a, the mobile terminal 100 uses transfer functions taking account of both the transient responses from the substrate 102 to the housing 101 and the transfer delays on the substrate 102. This approximate calculation has its basis on the nature of heat transfer described below.

Figure 7:
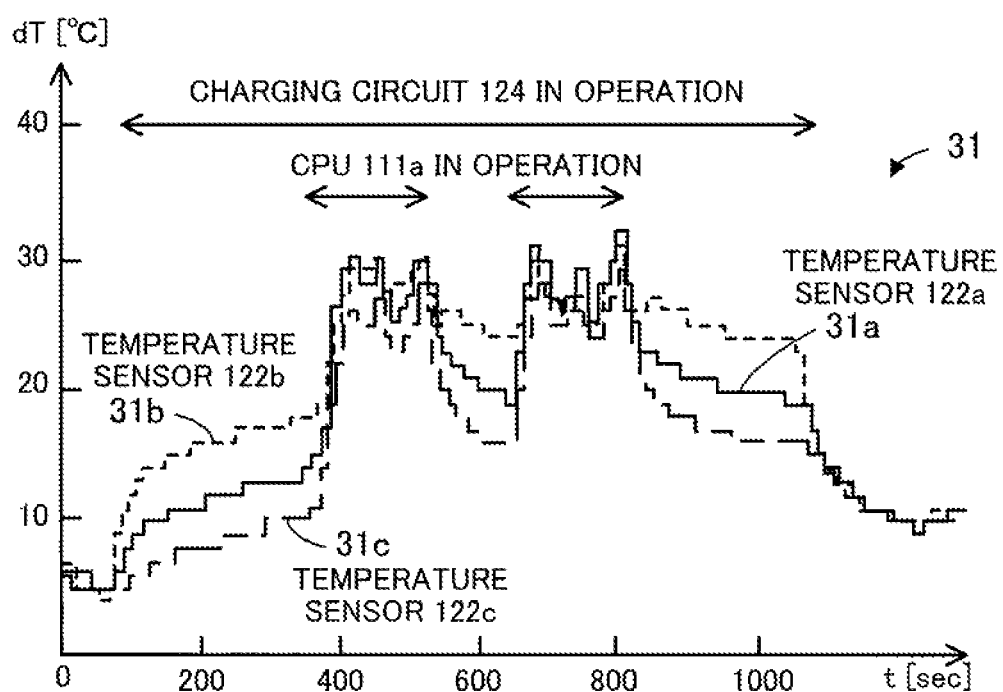
FIG. 7 is a graph of a first example illustrating changes in relative temperatures of a plurality of temperature sensors.

FIG. 7 is a graph of a first example illustrating changes in relative temperatures of a plurality of temperature sensors. A graph 31 illustrates changes in the relative temperatures (dT) of the temperature sensors 122a, 122b, and 122c in relation to the reference point temperature. A curve 31a represents changes in the relative temperature of the temperature sensor 122a disposed near the CPU 111a. A curve 31b represents changes in the relative temperature of the temperature sensor 122b disposed near the charging circuit 124. A curve 31c represents changes in the relative temperature of the temperature sensor 122c disposed near the power amplifier 114a.

As illustrated in the graph 31, as soon as the charging circuit 124 starts operating, the relative temperatures of the temperature sensors 122a, 122b, and 122c start to rise. As soon as the charging circuit 124 stops operating, the relative temperatures of the temperature sensors 122a, 122b, and 122c start to fall. In like fashion, as soon as the CPU 111a starts operating, the relative temperatures of the temperature sensors 122a, 122b, and 122c start to rise. As soon as the CPU 111a stops operating, the relative temperatures of the temperature sensors 122a, 122b, and 122c start to fall.

Thus, the changes in the relative temperatures of the temperature sensors 122a, 122b, and 122c as a result of the changes in the heat source temperatures have relatively short delays and give high-speed responses. That is, the thermal time constants of the measured temperatures of the temperature sensors 122a, 122b, and 122c are small compared to that of the surface temperature of the housing 101. In addition, there is a small variation in the response speed among the temperature sensors 122a, 122b, and 122c. This is because the substrate 102 is equipped with materials with small thermal resistance, such as copper wires, which contribute to high-speed heat transfer from the individual heat sources to the temperature sensors 122a, 122b, and 122c.

In view of the nature of heat transfer described above, the inverse matrix of H is approximately decomposed as defined in the following Expression (11), which means decomposing the numerator, $h_{ij}$, and the denominator, $1+s\tau_{hij}$, of each transfer function $H_{ij}(s)$. The operator on the right side of Expression (11) is the Hadamard product, which is the element-by-element product of corresponding elements of matrices, unlike with a general matrix product. The second term of the right side is the inverse matrix of a matrix including the heat transfer coefficients $h_{ij}$ but not including thermal time constants, and used to estimate the heat source temperatures. The first term of the right side is a matrix including one thermal time constant for each heat source, and used to estimate the surface temperature from the heat source temperatures.

$$H^{-1} \approx \begin{bmatrix} 1+s\tau_{h1} \\ 1+s\tau_{h2} \\ 1+s\tau_{h3} \end{bmatrix} \circ \begin{bmatrix} h_{11} & h_{12} & h_{13} \\ h_{21} & h_{22} & h_{23} \\ h_{31} & h_{32} & h_{33} \end{bmatrix}^{-1} \quad (11)$$

Estimating the heat source temperatures using the second term means assuming steady state while taking no account of transient responses under unsteady state conditions. This largely reduces the computational effort to estimate the heat source temperatures. Because the heat source temperatures estimated using the second term ignore delays in heat transfer to the temperature sensors 122a, 122b, and 122c from the heat sources, the estimated heat source temperatures correspond to the heat source temperatures at a point in time a predetermined time before the measurements made by the temperature sensors 122a, 122b, and 122c. Therefore, the first term is incorporated in the transfer functions for estimating the surface temperature from the heat source temperatures. This means taking account of estimated delays of the heat source temperatures in estimating the surface temperature.

Expression (11) contains the thermal time constant $\tau_{h1}$ corresponding to the CPU 111a, the thermal time constant $\tau_{h2}$ corresponding to the charging circuit 124, and the thermal time constant $\tau_{h3}$ corresponding to the power amplifier 114a. Note that $\tau_{h1}$, $\tau_{h2}$, and $\tau_{h3}$ may take the same value because the thermal time constants associated with the substrate 102 are not significant. The values of $\tau_{hi}$ are calculated in advance using the design device 200.

According to the approximate calculation described above, the relative temperatures $T_{h1}(s)$, $T_{h2}(s)$, and $T_{h3}(s)$ of the heat sources are calculated by the following Expression (12). A matrix H* is the matrix of approximative transfer functions on the substrate 102. The element in the $i^{th}$ row and $j^{th}$ column of the matrix H* is $h_{ij}$, representing the heat transfer from the $i^{th}$ heat source to the $j^{th}$ temperature sensor with no consideration for a thermal time constant. The inverse matrix of H* corresponds to the second term of the right side in Expression (11). The inverse matrix of H* is defined by the following Expression (13). $\Delta$ is an eigenvalue defined as: $\Delta=(h_{11}h_{22}-h_{12}h_{21})h_{33}+(h_{13}h_{21}-h_{11}h_{23})h_{32}+(h_{12}h_{23}-h_{13}h_{22})h_{31}$. Because the transient responses are not taken into consideration, the multiplication of the inverse matrix of H* and $T_{s1}(s)$, $T_{s2}(s)$, and $T_{s3}(s)$ involves greatly reduced computational effort compared to the computational effort for the multiplication of the inverse matrix of H and $T_{s1}(s)$, $T_{s2}(s)$, and $T_{s3}(s)$.

$$\begin{bmatrix} T_{h1}(s) \\ T_{h2}(s) \\ T_{h3}(s) \end{bmatrix} = H^{*-1} \begin{bmatrix} T_{s1}(s) \\ T_{s2}(s) \\ T_{s3}(s) \end{bmatrix} = \begin{bmatrix} h_{11} & h_{12} & h_{13} \\ h_{21} & h_{22} & h_{23} \\ h_{31} & h_{32} & h_{33} \end{bmatrix}^{-1} \begin{bmatrix} T_{s1}(s) \\ T_{s2}(s) \\ T_{s3}(s) \end{bmatrix} \quad (12)$$

$$H^{*-1} = \frac{1}{\Delta} \begin{bmatrix} H_{22}H_{33}-H_{23}H_{32} & H_{13}H_{32}-H_{12}H_{33} & H_{12}H_{23}-H_{13}H_{22} \\ H_{23}H_{31}-H_{21}H_{33} & H_{11}H_{33}-H_{13}H_{31} & H_{11}H_{23}-H_{13}H_{21} \\ H_{21}H_{32}-H_{22}H_{31} & H_{12}H_{31}-H_{11}H_{32} & H_{11}H_{22}-H_{12}H_{21} \end{bmatrix} \quad (13)$$

Then, according to the approximate calculation above, the relative surface temperature of the housing 101 $T_{surf}(s)$ is calculated by the following Expression (14) using the estimated $T_{h1}(s)$, $T_{h2}(s)$, and $T_{h3}(s)$. $T_{surf}(s)$ is expressed as a sum of products of $G^*_i(s)$ and $T_{hi}(s)$. $G^*_i(s)$ is the transfer function representing heat transfer from the $i^{th}$ heat source to the housing 101. $g_i$ is the heat transfer coefficient for heat transfer from the $i^{th}$ heat source to the housing 101. $\tau_{hi}$ is the thermal time constant for heat transfer from the $i^{th}$ heat source over the substrate 102, and $\tau_{g1i}$ and $\tau_{g2i}$ are the thermal time constants for heat transfer from the $i^{th}$ heat source to the housing 101. Thus, in order to reflect the estimated delays of the heat source temperatures, the thermal constant $\tau_{hi}$ associated with heat transfer over the substrate 102 is incorporated in the transfer functions for estimating the surface temperature from the heat source temperatures.

$$T_{surf}(s) = \begin{bmatrix} G^*_1(s) \\ G^*_2(s) \\ G^*_3(s) \end{bmatrix}^T \begin{bmatrix} T_{h1}(s) \\ T_{h2}(s) \\ T_{h3}(s) \end{bmatrix} \quad (14)$$

where $G^*_i(s) = \dfrac{g_i(1+s\tau_{hi})}{(1+s\tau_{g1i})(1+s\tau_{g2i})}$

Next described is a parameter determining method used by the design device 200. The design device 200 determines the heat transfer coefficients $h_{11}$, $h_{12}$, $h_{13}$, $h_{21}$, $h_{22}$, $h_{23}$, $h_{31}$, $h_{32}$, and $h_{33}$ for heat transfer over the substrate 102. To do so, the design device 200 uses an actual machine or a sample implementation of the mobile terminal 100 to acquire measured temperatures when each heat source is made to operate solely.

Specifically, the design device 200 acquires measured temperatures of the temperature sensors 122a, 122b, 122c, and 122d by allowing only the CPU 111a to operate while stopping the charging circuit 124 and the power amplifier 114a. The design device 200 subtracts the reference point temperature of the temperature sensor 122d from the measured temperature of each of the temperature sensors 122a, 122b, and 122c to thereby calculate relative temperatures of the temperature sensors 122a, 122b, and 122c. Then, using time-domain fitting procedures, the design device 200 calculates such $h_{21}$ and $h_{31}$ that most appropriately represent the relationship between the relative temperature of the temperature sensor 122a and the relative temperatures of the temperature sensors 122b and 122c. $h_{11}$ takes a value of "1.0". Note however that, instead of calculating $h_{21}$ and $h_{31}$ with reference to the relative temperature of the temperature sensor 122a, the design device 200 may directly measure the heat source temperature of the CPU 111a and calculate $h_{11}$, $h_{21}$, and $h_{31}$ based on the measured heat source temperature.

In like fashion, the design device 200 acquires measured temperatures of the temperature sensors 122a, 122b, 122c, and 122d by allowing only the charging circuit 124 to operate while stopping the CPU 111a and the power amplifier 114a. Using time-domain fitting procedures, the design device 200 calculates such $h_{12}$ and $h_{32}$ that most appropriately represent the relationship between the relative temperature of the temperature sensor 122b and the relative temperatures of the temperature sensors 122a and 122c. $h_{22}$ takes a value of "1.0". Similarly, the design device 200 acquires measured temperatures of the temperature sensors 122a, 122b, 122c, and 122d by allowing only the power amplifier 114a to operate while stopping the CPU 111a and the charging circuit 124. Using time-domain fitting procedures, the design device 200 calculates such $h_{13}$ and $h_{23}$ that most appropriately represent the relationship between the relative temperature of the temperature sensor 122c and the relative temperatures of the temperature sensors 122a and 122b. $h_{33}$ takes a value of "1.0".

That is, the heat transfer coefficients $h_{11}$, $h_{12}$, $h_{13}$, $h_{21}$, $h_{22}$, $h_{23}$, $h_{31}$, $h_{32}$, and $h_{33}$ are determined as given in the following Expression (15). $T_{s1}(t)$, $T_{s2}(t)$, and $T_{s3}(t)$ are the measured temperatures of the temperature sensors 122a, 122b, and 122c, respectively, as of time t. $T_{rt}(t)$ is the measured temperature of the temperature sensor 122d, i.e., the reference point temperature, as of time t. $T_{h1}(t)$, $T_{h2}(t)$, and $T_{h3}(t)$ are the heat source temperatures as of time t. For example, $h_{11}=1.0$, $h_{12}=0.6$, $h_{13}=0.6$, $h_{21}=0.7$, $h_{22}=1.0$, $h_{23}=0.4$, $h_{31}=1.0$, $h_{32}=0.3$, and $h_{33}=1.0$.

$$\begin{bmatrix} T_{s1}(t)-T_{rt}(t) \\ T_{s2}(t)-T_{rt}(t) \\ T_{s3}(t)-T_{rt}(t) \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} T_{h1}(t)-T_{rt}(t) \\ T_{h2}(t)-T_{rt}(t) \\ T_{h3}(t)-T_{rt}(t) \end{bmatrix} \quad (15)$$

Figure 8:
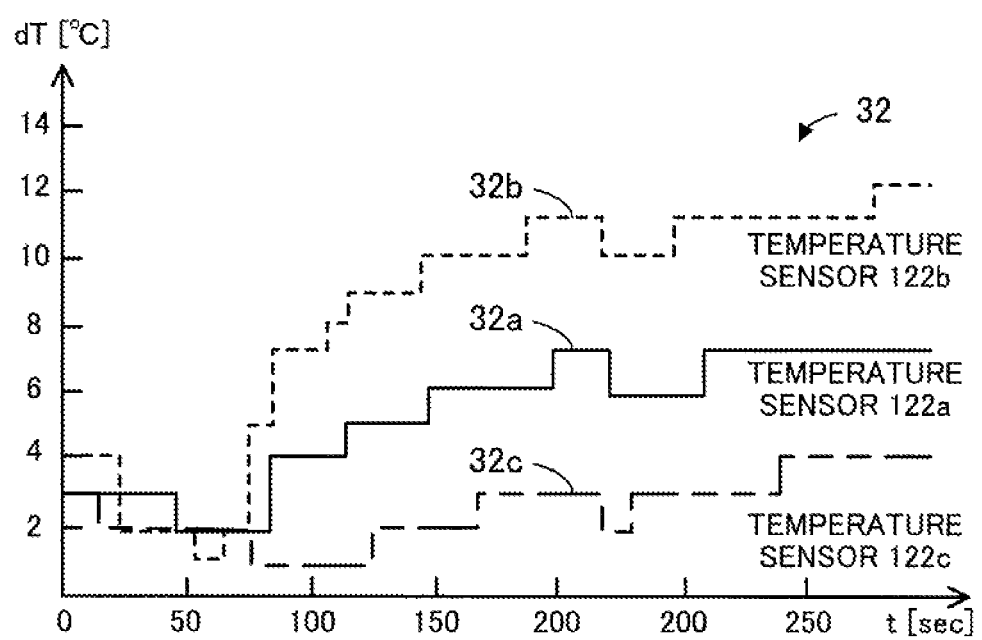
FIG. 8 is a graph of a second example illustrating changes in the relative temperatures of the temperature sensors.

FIG. 8 is a graph of a second example illustrating changes in relative temperatures of the plurality of temperature sensors. A graph 32 illustrates relative temperatures of the temperature sensors 122a, 122b, and 122c, obtained in the case of operating only the charging circuit 124 while stopping the CPU 111a and the power amplifier 114a. A curve 32a represents the relative temperature of the temperature sensor 122a; a curve 32b represents the relative temperature of the temperature sensor 122b; and a curve 32c represents the relative temperature of the temperature sensor 122c. Because the temperature sensor 122b is disposed closest to the charging circuit 124, the relative temperature of the temperature sensor 122b is higher than those of the temperature sensors 122a and 122c.

Using time-domain fitting procedures, when $h_{12}$=0.6, the minimum error is achieved between the relative temperature of the temperature sensor 122a and the result obtained by multiplying the relative temperature of the temperature sensor 122b by $h_{12}$. As a result, $h_{12}$ is determined to be 0.6. In like fashion, when $h_{32}$=0.3, the minimum error is achieved between the relative temperature of the temperature sensor 122c and the result obtained by multiplying the relative temperature of the temperature sensor 122b by $h_{32}$. As a result, $h_{32}$ is determined to be 0.3.

Next, the design device 200 determines the heat transfer coefficients $g_1$, $g_2$, and $g_3$, the thermal time constants $\tau_{h1}$, $\tau_{h2}$, and $\tau_{h3}$, and the thermal time constants $\tau_{g11}$, $\tau_{g21}$, $\tau_{g12}$, $\tau_{g22}$, $\tau_{g13}$, and $\tau_{g23}$. To do so, the design device 200 uses an actual machine or a sample implementation of the mobile terminal 100 to measure the temperature at various locations when each heat source is made to operate solely. Specifically, the design device 200 measures the heat source temperatures of the CPU 111a, the charging circuit 124, and the power amplifier 114a. In addition, the design device 200 selects, across the surface of the housing 101, a location at which the surface temperature is desired to be measured, and measures the surface temperature at the selected location. Two or more such locations may be selected. Further, the design device 200 acquires the reference point temperature measured by the temperature sensor 122d.

The design device 200 subtracts the reference point temperature from each heat source temperature to thereby calculate the relative temperature of the heat source. The design device 200 converts the time-series data of the relative temperature of each heat source into data in the frequency domain by using the Laplace transform. In addition, the design device 200 subtracts the reference temperature from the surface temperature to calculate the relative temperature of the housing 101. The design device 200 converts the time-series data of the relative temperature of the housing 101 into data in the frequency domain by using the Laplace transform. Subsequently, using frequency-domain fitting procedures, the design device 200 determines the heat transfer coefficients $g_1$, $g_2$, and $g_3$, the thermal time constants $\tau_{h1}$, $\tau_{h2}$, and $\tau_{h3}$, and the thermal time constants $\tau_{g11}$, $\tau_{g21}$, $\tau_{g12}$, $\tau_{g22}$, $\tau_{g13}$, and $\tau_{g23}$. The frequency-domain fitting procedures employ, for example, the least-squares method.

That is, the heat transfer coefficients $g_1$, $g_2$, and $g_3$, the thermal time constants $\tau_{h1}$, $\tau_{h2}$, and $\tau_{h3}$, and the thermal time constants $\tau_{g11}$, $\tau_{g21}$, $\tau_{g12}$, $\tau_{g22}$, $\tau_{g13}$, and $\tau_{g23}$ are determined as given in the following Expression (16). $T_{surf}(t)$ is the surface temperature as of time t. $T_{rt}(t)$ is the measured temperature of the temperature sensor 122d, i.e., the reference point temperature, as of time t. $T_{h1}(t)$, $T_{h2}(t)$, and $T_{h3}(t)$ are the heat source temperatures as of time t.

$$\mathcal{L}(T_{surf}(t) - T_{rt}(t)) = \begin{bmatrix} G_1^*(s) \\ G_2^*(s) \\ G_3^*(s) \end{bmatrix}^T \begin{bmatrix} \mathcal{L}(T_{h1}(t) - T_{rt}(t)) \\ \mathcal{L}(T_{h2}(t) - T_{rt}(t)) \\ \mathcal{L}(T_{h3}(t) - T_{rt}(t)) \end{bmatrix} \quad (16)$$

In the above-described manner, the heat transfer coefficients $h_{11}$, $h_{12}$, $h_{13}$, $h_{21}$, $h_{22}$, $h_{23}$, $h_{31}$, $h_{32}$, and $h_{33}$, the heat transfer coefficients $g_1$, $g_2$, and $g_3$, the thermal time constants $\tau_{h1}$, $\tau_{h2}$, and $\tau_{h3}$, and the thermal time constants $\tau_{g11}$, $\tau_{g21}$, $\tau_{g12}$, $\tau_{g22}$, $\tau_{g13}$, and $\tau_{g23}$ are determined.

FIG. 9 illustrates an example of an intermediate parameter table. The design device 200 generates an intermediate parameter table 41. The intermediate parameter table 41 associates the parameter name of each parameter with the value of the parameter. Parameters indicated by the parameter names include the heat transfer coefficients $h_{11}$, $h_{12}$, $h_{13}$, $h_{21}$, $h_{22}$, $h_{23}$, $h_{31}$, $h_{32}$, and $h_{33}$, the heat transfer coefficients $g_1$, $g_2$, and $g_3$, the thermal time constants $\tau_{h1}$, $\tau_{h2}$, and $\tau_{h3}$, and the thermal time constants $\tau_{g11}$, $\tau_{g21}$, $\tau_{g12}$, $\tau_{g22}$, $\tau_{g13}$, and $\tau_{g23}$. These parameters are primary parameters appearing in the transfer functions, and are therefore considered to be intermediate parameters. Note that parameters appearing in estimation equations used to estimate the surface temperature are secondary parameters derived from these intermediate parameters. As illustrated in FIG. 9, the value of each parameter, determined by the above-described method is registered in the intermediate parameter table 41 in association with the corresponding parameter name.

FIG. 10 illustrates an example of a parameter table. Based on the intermediate parameter table 41, the design device 200 generates a parameter table 42. The parameter table 42 associates the parameter name of each parameter with the value of the parameter. Parameters indicated by the parameter names include $h^*_{11}$, $h^*_{12}$, $h^*_{13}$, $h^*_{21}$, $h^*_{22}$, $h^*_{23}$, $h^*_{31}$, $h^*_{32}$, $h^*_{33}$, $a_{01}$, $a_{11}$, $a_{21}$, $b_{11}$, $b_{21}$, $a_{02}$, $a_{12}$, $a_{22}$, $b_{12}$, $b_{22}$, $a_{03}$, $a_{13}$, $a_{23}$, $b_{13}$, and $b_{23}$. These parameters are derived from the intermediate parameters in the intermediate parameter table 41. The parameters in the parameter table 42 are going to be stored in the mobile terminal 100.

$h^*_{11}$, $h^*_{12}$, $h^*_{13}$, $h^*_{21}$, $h^*_{22}$, $h^*_{23}$, $h^*_{31}$, $h^*_{32}$, and $h^*_{33}$ are elements of the matrix in Expression (13) above. $h^*_{ij}$ is found in the $i^{th}$ row and $j^{th}$ column of the inverse matrix of H*. $h^*_{11}$, $h^*_{12}$, $h^*_{13}$, $h^*_{21}$, $h^*_{22}$, $h^*_{23}$, $h^*_{31}$, $h^*_{32}$, and $h^*_{33}$ are derived from the heat transfer coefficients $h_{11}$, $h_{12}$, $h_{13}$, $h_{21}$, $h_{22}$, $h_{23}$, $h_{31}$, $h_{32}$, and $h_{33}$. $a_{01}$, $a_{11}$, $a_{21}$, $b_{11}$, $b_{21}$, $a_{02}$, $a_{12}$, $a_{22}$, $b_{12}$, $b_{22}$, $a_{03}$, $a_{13}$, $a_{23}$, $b_{13}$, and $b_{23}$ are parameters appearing in difference equations of $G^*_1(s)$, $G^*_2(s)$, and $G^*_3(s)$ as describe later. $a_{01}$, $a_{11}$, $a_{21}$, $b_{11}$, $b_{21}$, $a_{11}$, $a_{12}$, $a_{22}$, $b_{12}$, $b_{22}$, $a_{03}$, $a_{13}$, $a_{23}$, $b_{13}$, and $b_{23}$ are derived from the heat transfer coefficients $g_1$, $g_2$, and $g_3$, the thermal time constants $\tau_{h1}$, $\tau_{h2}$, and $\tau_{h3}$, and the thermal time constants $\tau_{g11}$, $\tau_{g21}$, $\tau_{g12}$, $\tau_{g22}$, $\tau_{g13}$, and $\tau_{g23}$.

Next described is a method for estimating the surface temperature employed by the mobile terminal 100. The mobile terminal 100 acquires the measured temperatures of the temperature sensors 122a, 122b, 122c, and 122d. Then, the mobile terminal 100 calculates the relative temperatures of the temperature sensors 122a, 122b, and 122c by subtracting the reference point temperature of the temperature sensor 122d from each of the measured temperatures of the temperature sensors 122a, 122b, and 122c. From the relative temperatures of the temperature sensors 122a, 122b, and 122c, the mobile terminal 100 estimates the relative temperatures of the CPU 111a, the charging circuit 124, and the power amplifier 114a according to the following Expression (17). In this regard, $h^*_{11}$, $h^*_{12}$, $h^*_{13}$, $h^*_{21}$, $h^*_{22}$, $h^*_{23}$, $h^*_{31}$, $h^*_{32}$, and $h^*_{33}$ are used as the parameters. The relative temperature of each heat source is estimated in the time domain. Therefore, each time the measured temperatures of the temperature sensors 122a, 122b, 122c, and 122d are acquired, estimations are made for the relative temperatures of the CPU 111a, the charging circuit 124, and the power amplifier 114a at a given point in time.

$$\begin{bmatrix} T_{h1}(t) - T_{rt}(t) \\ T_{h2}(t) - T_{rt}(t) \\ T_{h3}(t) - T_{rt}(t) \end{bmatrix} = \begin{bmatrix} h_{11} & h_{12} & h_{13} \\ h_{21} & h_{22} & h_{23} \\ h_{31} & h_{32} & h_{33} \end{bmatrix}^{-1} \begin{bmatrix} T_{s1}(t) - T_{rt}(t) \\ T_{s2}(t) - T_{rt}(t) \\ T_{s3}(t) - T_{rt}(t) \end{bmatrix} \quad (17)$$

Figure 11:
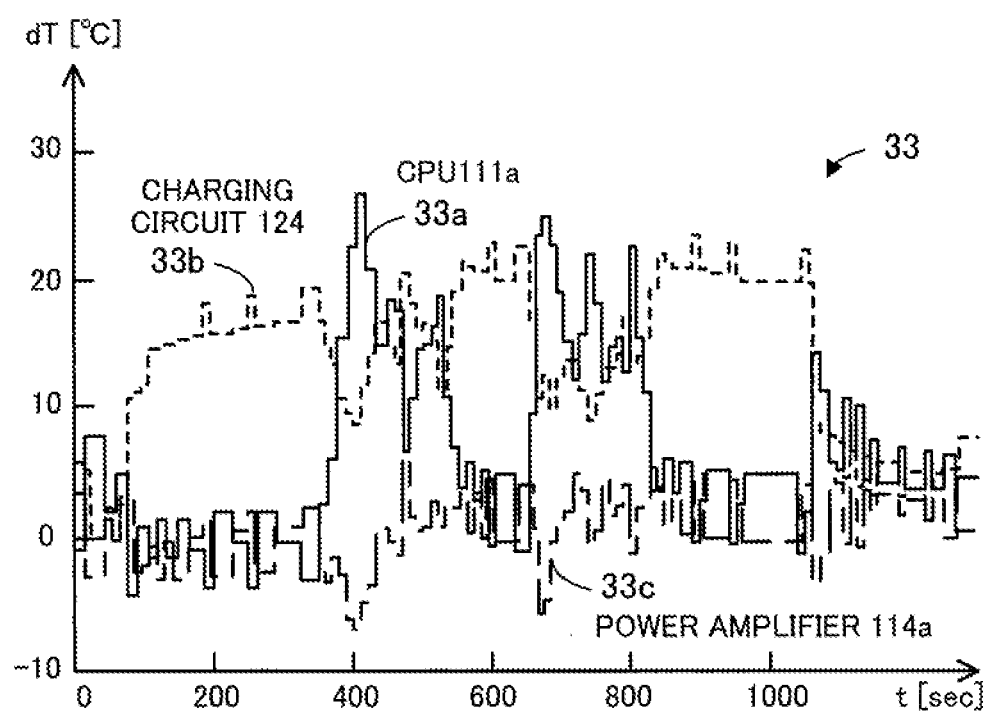
FIG. 11 is a graph illustrating an example of estimated relative temperatures of the plurality of heat sources.

FIG. 11 is a graph illustrating an example of estimated relative temperatures of a plurality of heat sources. A graph 33 illustrates the relative temperatures of the CPU 111a, the charging circuit 124, and the power amplifier 114a estimated from the graph 31 of FIG. 7. A curve 33a represents the estimated relative temperature of the CPU 111a. A curve 33b represents the estimated relative temperature of the charging circuit 124. A curve 33c represents the estimated relative temperature of the power amplifier 114a.

Based on the estimated relative temperatures of the CPU 111a, the charging circuit 124, and the power amplifier 114a, the mobile terminal 100 estimates the surface temperature of a predetermined location on the surface of the housing 101. In the case where two or more locations on the surface of the housing 101 have been selected, the mobile terminal 100 estimates the surface temperature of each of the selected locations. In this case, different values are used for the transfer functions $G^*_1(s)$, $G^*_2(s)$, and $G^*_3(s)$ according to each location for estimating the surface temperature. That is, values of the parameters $a_{01}$, $a_{11}$, $a_{21}$, $b_{11}$, $b_{21}$, $a_{02}$, $a_{12}$, $a_{22}$, $b_{12}$, $b_{22}$, $a_{03}$, $a_{13}$, $a_{23}$, $b_{13}$, and $b_{23}$ are prepared for each of the locations for estimating the surface temperature.

The surface temperature is defined by the following Expression (18). $T_{surf}(t)$ is the surface temperature as of time t. $T_{surf-1}(t)$ is the contribution from the CPU 111a as of time t, that is, an amount of increase in the surface temperature attributed to heat generated by the CPU 111a as of time t. $T_{surf-2}(t)$ is the contribution from the charging circuit 124 as of time t, that is, an amount of increase in the surface temperature attributed to heat generated by the charging circuit 124 as of time t. $T_{surf-3}(t)$ is the contribution from the power amplifier 114a as of time t, that is, an amount of increase in the surface temperature attributed to heat generated by the power amplifier 114a as of time t. The surface temperature as of time t is obtained by adding the contributions from the CPU 111a, the charging circuit 124, and the power amplifier 114a to the reference point temperature as of time t.

$$T_{surf}(t) = T_{surf-1}(t) + T_{surf-2}(t) + T_{surf-3}(t) + T_{tr}(t) \quad (18)$$

$$= \mathcal{L}^{-1}(G_1^*(s)T_{h1}(s)) + \mathcal{L}^{-1}(G_2^*(s)T_{h2}(s)) + \mathcal{L}^{-1}(G_3^*(s)T_{h3}(s)) + T_{rt}(t)$$

The contribution from the CPU 111a as of time t corresponds to a value obtained by taking the inverse Laplace transform of the product of $G^*_1(s)$ and $T_{h1}(s)$. The contribution from the charging circuit 124 as of time t corresponds to a value obtained by taking the inverse Laplace transform of the product of $G^*_2(s)$ and $T_{h2}(s)$. The contribution from the power amplifier 114a as of time t corresponds to a value obtained by taking the inverse Laplace transform of the product of $G^*_3(s)$ and $T_{h3}(s)$. Each of the inverse Laplace transforms of the product of $G^*_i(s)$ and $T_{hi}(s)$ is expanded into a calculation in the time domain using a difference equation, as seen in the following Expression (19).

$$T_{surf-i}(t) = a_{0i}(T_{hi}(t) - T_{rt}(t)) + \quad (19)$$
$$a_{1i}(T_{hi}(t - \Delta t) - T_{rt}(t - \Delta t)) + a_{2i}(T_{hi}(t - 2\Delta t) - T_{rt}(t - 2\Delta t)) -$$
$$b_{1i}T_{surf-i}(t - \Delta t) - b_{2i}T_{surf-i}(t - 2\Delta t)$$

$T_{surf-i}(t)$ represents the contribution from the $i^{th}$ heat source as of time t. The first term of the right side of Expression (19) concerns the relative temperature of the $i^{th}$ heat source as of time t. The second term of the right side concerns the relative temperature of the $i^{th}$ heat source the time $\Delta t$ ago. $\Delta t$ is the measurement cycle period, and about 10 seconds, for example. $t - \Delta t$ means the last measurement time point. The third term of the right side concerns the relative temperature of the $i^{th}$ heat source the time $2\Delta t$ ago. $t - 2\Delta t$ means the measurement time point before last. The fourth term of the right side concerns the estimate of the contribution from the $i^{th}$ heat source the time $\Delta t$ ago. The fifth term of the right side concerns the estimate of the contribution from the $i^{th}$ heat source the time $2\Delta t$ ago.

The first term includes the multiplication of a coefficient $a_{0i}$. The second term includes the multiplication of a coefficient $a_{1i}$. The third term includes the multiplication of a coefficient $a_{2i}$. The fourth term includes the multiplication of a coefficient $b_{1i}$. The fifth term includes the multiplication of a coefficient $b_{2i}$. The coefficients $a_{0i}$, $a_{1i}$, $a_{2i}$, $b_{1i}$, and $b_{2i}$ are defined as given in Expression (20), using and $\tau_{g2i}$. Herewith, $T_{surf-1}(t)$, $T_{surf-2}(t)$, and $T_{surf-3}(t)$ in Expression (18) are calculated.

$$a_{0i} = \frac{g_i(2\Delta t \tau_{hi} + \Delta t^2)}{bb_i} \quad a_{1i} = \frac{2g_i \Delta t^2}{bb_i} \quad a_{2i} = \frac{g_i(-2\Delta t \tau_{hi} + \Delta t^2)}{bb_i} \quad (20)$$

$$b_{1i} = \frac{-8\tau_{g1i}\tau_{g2i} + 2\Delta t^2}{bb_i} \quad b_{2i} = \frac{4\tau_{g1i}\tau_{g2i} - 2\Delta t(\tau_{g1i} + \tau_{g2i}) + \Delta t^2}{bb_i}$$

where $bb_i = 4\tau_{g1i}\tau_{g2i} + 2\Delta t(\tau_{g1i} + \tau_{g2i}) + \Delta t^2$ In order to use the difference equation in Expression (19), the following needs to be recorded with respect to each heat source: the relative temperature calculated last time; the relative temperature calculated the time before last; the contribution estimated last time; and the contribution estimated the time before last. FIG. 12 illustrates an example of a previous data table. The mobile terminal 100 has a previous data table 43. The previous data table 43 associates each heat source with their data names and values. The CPU 111a, the charging circuit 124, and the power amplifier 114a are included as heat sources. The data names associated with each heat source include the last-time relative temperature of the heat source; the time-before-last relative temperature of the heat source; the last-time estimated contribution from the heat source; and the time-before-last estimated contribution from the heat source. That is, the previous data table 43 contains twelve values. The mobile terminal 100 updates the previous data table 43 each time it acquires the measured temperatures from the temperature sensors 122a, 122b, 122c, and 122d and estimates the surface temperature.

Figure 13:
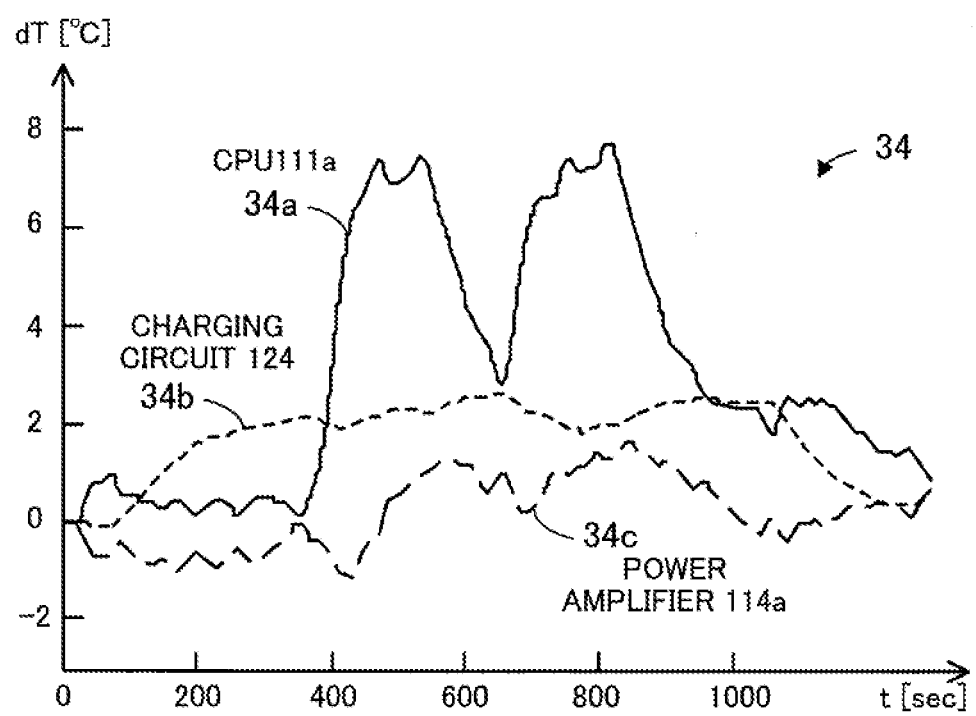
FIG. 13 is a graph illustrating estimated heat contributions from the heat sources to the housing surface.

FIG. 13 is a graph illustrating estimated heat contributions from the heat sources to the housing surface. A graph 34 represents contributions of the CPU 111a, the charging circuit 124, and the power amplifier 114a to the increase in the surface temperature, estimated from the graph 33 of FIG. 11. A curve 34a represents the contribution of the CPU 111a to the housing 101. A curve 34b represents the contribution of the charging circuit 124 to the housing 101. A curve 34c represents the contribution of the power amplifier 114a to the housing 101.

Figure 14:
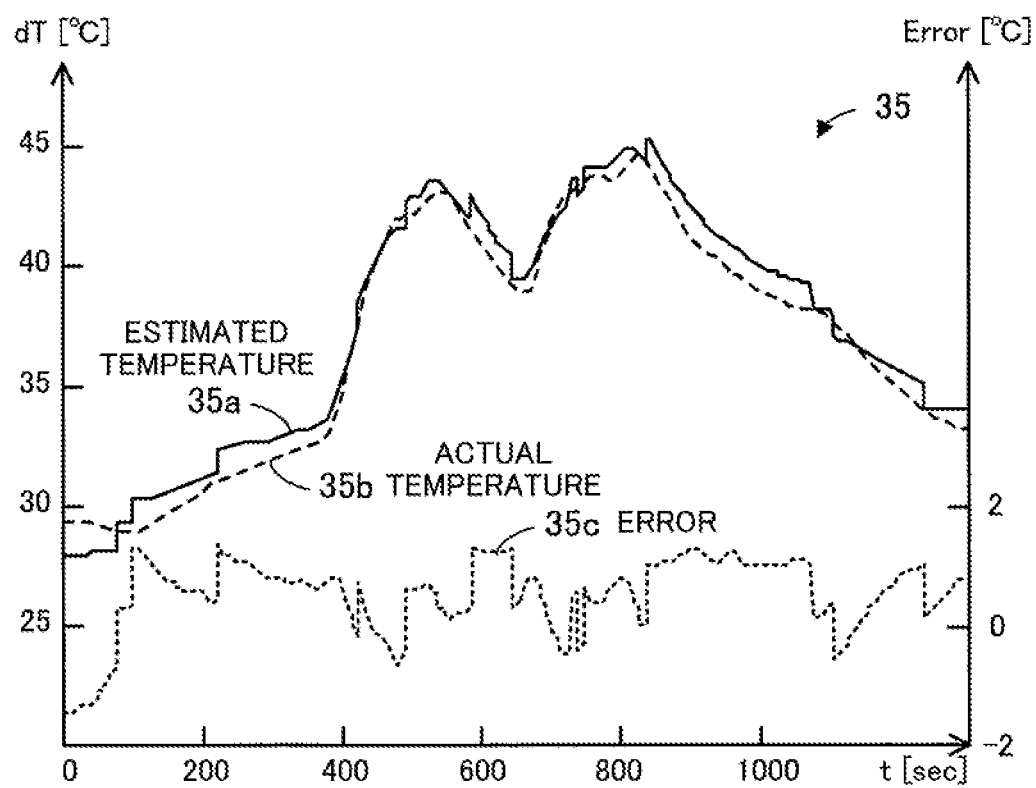
FIG. 14 is a graph illustrating an example of estimated surface temperature.

FIG. 14 is a graph illustrating an example of the estimated surface temperature. A graph 35 contains estimated surface temperature, actual surface temperature, and error between the two. A curve 35a represents the estimated surface temperature. The estimated surface temperature is obtained by adding the contributions of the CPU 111a, the charging circuit 124, and the power amplifier 114a illustrated in the graph 34 to the reference point temperature. A curve 35b represents the surface temperature measured with the use of an actual machine or a sample implementation of the mobile terminal 100. A curve 35c represents the error between the curves 35a and 35b. As indicated by the curve 35c, the absolute value of the error falls within 1° C. in large part according to this experimental example.

The mobile terminal 100 controls the heat sources based on the estimated surface temperature. If the estimated surface temperature exceeds a threshold, the mobile terminal 100 controls the operating level of one or two or more of the heat sources so as to reduce the surface temperature. In the case where the surface temperature is estimated for two or more locations, the mobile terminal 100 compares the maximum value of the estimated surface temperatures with the threshold. When the estimated surface temperature exceeds the threshold, the mobile terminal 100 reduces, for example, the clock frequency of the CPU 111a.

FIG. 15 illustrates an example of a CPU control table. A CPU control table 44 indicates specifications of the operating levels of the CPU 111a. The mobile terminal 100 may hold the CPU control table 44 in order to control the operating level of the CPU 111a. The CPU control table 44 associates each limitation step and its clock frequency. Each limitation step is an integer representing the magnitude of the limit of the computing power of the CPU 111a. The limitation step being 0 means no limit, and the limitation step being 5 means the maximum limit.

For example, with the limitation step being 0, the CPU 111a operates at a clock frequency of 2.0 GHz. With the limitation step being 1, the CPU 111a operates at a clock frequency of 1.8 GHz. With the limitation step being 2, the CPU 111a operates at a clock frequency of 1.6 GHz. With the limitation step being 3, the CPU 111a operates at a clock frequency of 1.4 GHz. With the limitation step being 4, the CPU 111a operates at a clock frequency of 1.2 GHz. With the limitation step being 5, the CPU 111a operates at a clock frequency of 1.0 GHz. A smaller limitation step corresponds to a higher clock frequency, which results in higher computing power and therefore a larger amount of heat generation. On the other hand, a larger limitation step corresponds to a lower clock frequency, which results in lower computing power and therefore a smaller amount of heat generation.

In like fashion, the mobile terminal 100 may switch the charging circuit 124 on and off according to the estimated surface temperature. For example, the mobile terminal 100 turns the charging circuit 124 off to stop the charging process when the estimated surface temperature exceeds the threshold. The mobile terminal 100 may control the transmission rate of the wireless interface 114 according to the estimated surface temperature. For example, the mobile terminal 100 decreases the transmission rate of the wireless interface 114 when the estimated surface temperature exceeds the threshold.

Figure 16:
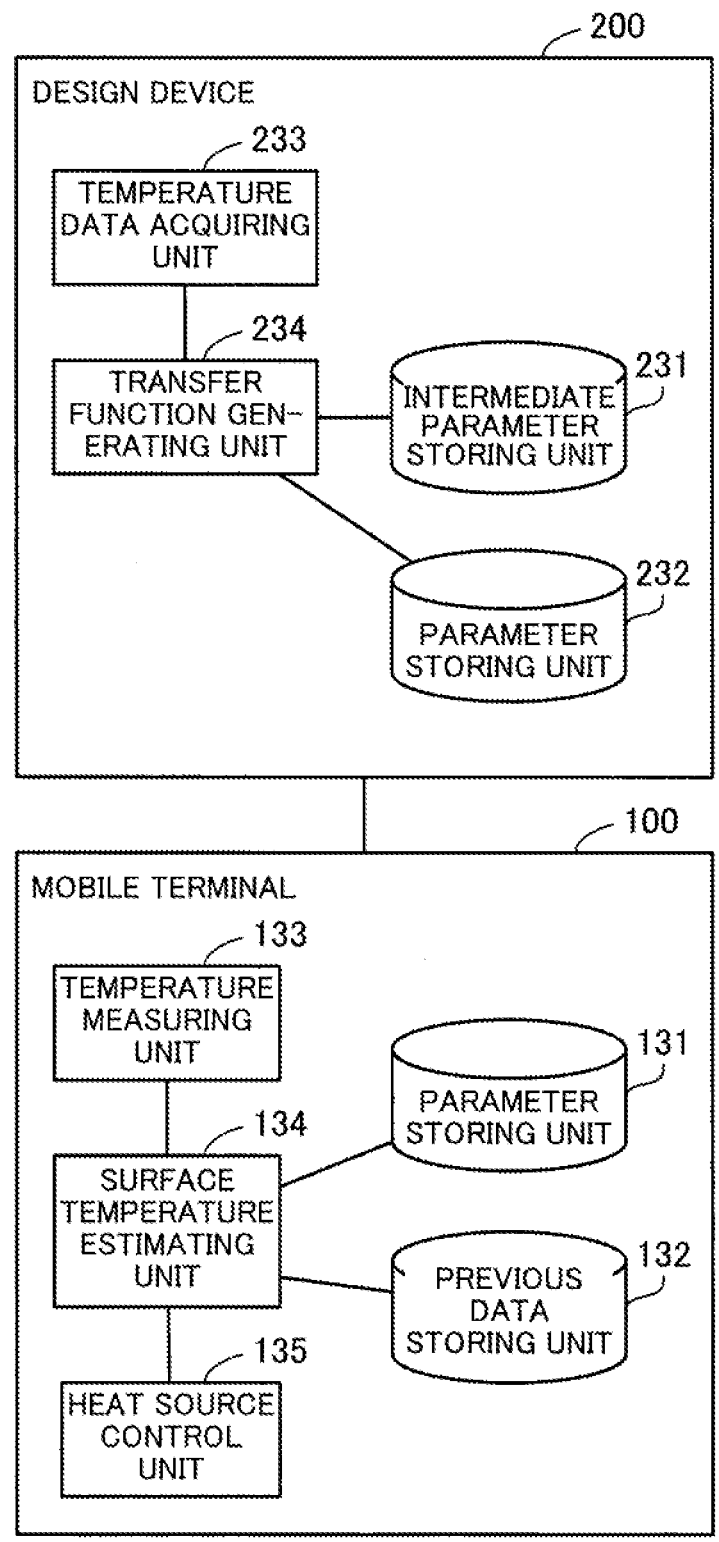
FIG. 16 is a block diagram illustrating an example of functions of the mobile terminal and the design device.

Next described are functions of the mobile terminal 100 and the design device 200. FIG. 16 is a block diagram illustrating an example of functions of the mobile terminal and the design device. The mobile terminal 100 includes a parameter storing unit 131, a previous data storing unit 132, a temperature measuring unit 133, a surface temperature estimating unit 134, and a heat source control unit 135. Each of the parameter storing unit 131 and the previous data storing unit 132 is implemented as a storage area allocated, for example, in the RAM 112 or the non-volatile memory 113. The temperature measuring unit 133, the surface temperature estimating unit 134, and the heat source control unit 135 are implemented, for example, as modules of a program executed by the CPU 111a or 111b.

The parameter storing unit 131 stores therein the parameter table 42 of FIG. 10. The parameter table 42 may be stored in the parameter storing unit 131, for example, at the time of manufacture or before shipment of the mobile terminal 100. In addition, the parameter table 42 may be stored in the storage medium 120a and distributed to the mobile terminal 100. Further, the parameter table 42 may be distributed to the mobile terminal 100 from a server device via a wireless network. The previous data storing unit 132 stores therein the previous data table 43 of FIG. 12.

The temperature measuring unit 133 periodically acquires the measured temperatures from the temperature sensors 122a, 122b, 122c, and 122d with a cycle period of $\Delta t$ (for example, $\Delta t=10$ seconds). The surface temperature estimating unit 134 periodically estimates the surface temperature of the housing 101 with a cycle period of $\Delta t$. Specifically, the surface temperature estimating unit 134 acquires the measured temperatures of the temperature sensors 122a, 122b, 122c, and 122d from the temperature measuring unit 133. Based on the acquired measured temperatures of the temperature sensors 122a, 122b, 122c, and 122d and the parameter values stored in the parameter storing unit 131, the surface temperature estimating unit 134 calculates the relative temperature of each of the plurality of heat sources.

In addition, the surface temperature estimating unit 134 reads previous data from the previous data storing unit 132. Then, based on the relative temperatures of the individual heat sources, the previous data, and the parameter values stored in the parameter storing unit 131, the surface temperature estimating unit 134 estimates the surface temperature of a predetermined location on the surface of the housing 101. The surface temperature estimating unit 134 may calculate the surface temperature of a plurality of locations using different parameter values. Using the estimation results of the surface temperature, the surface temperature estimating unit 134 updates the previous data stored in the previous data storing unit 132.

Based on the surface temperature estimated by the surface temperature estimating unit 134, the heat source control unit 135 controls components of the mobile terminal 100, which generate heat (i.e., acting as heat sources). In the case where the surface temperature estimating unit 134 periodically calculates the surface temperature of a plurality of locations, the heat source control unit 135 selects the maximum surface temperature amongst the calculated surface temperatures. The heat source control unit 135 compares, with a predetermined threshold, the surface temperature acquired from the surface temperature estimating unit 134, or the maximum surface temperature selected. If the surface temperature exceeds the threshold, the heat source control unit 135 controls the operating level of one or more of the heat sources.

For example, the heat source control unit 135 increases the limitation step of the CPU 111a according to the CPU control table 44 of FIG. 15. Herewith, the clock frequency of the CPU 111a is reduced. For example, the heat source control unit 135 decreases the transmission rate of the wireless interface 114. For example, the heat source control unit 135 stops the charging process of the charging circuit 124. The operating level of each of the CPU 111a and the wireless interface 114 is controlled, for example, via the power control unit 121 to which the CPU 111a issues an instruction.

The design device 200 includes an intermediate parameter storing unit 231, a parameter storing unit 232, a temperature data acquiring unit 233, and a transfer function generating unit 234. Each of the intermediate parameter storing unit 231 and the parameter storing unit 232 is implemented as a storage area allocated, for example, in the RAM 212 or the HDD 213. The temperature data acquiring unit 233 and the transfer function generating unit 234 are implemented, for example, as modules of a program executed by the CPU 211.

The intermediate parameter storing unit 231 stores therein the intermediate parameter table 41 of FIG. 9. The intermediate parameter table 41 is generated by the design device 200. The parameter storing unit 232 stores therein the parameter table 42. The parameter table 42 is generated by the design device 200 based on the intermediate parameter table 41. The generated parameter table 42 may be stored in the non-volatile memory 113 of the mobile terminal 100 at the time of manufacture or before shipment of the mobile terminal 100. Alternatively, the generated parameter table 42 may be stored in the storage medium 120a, or distributed over a network.

The temperature data acquiring unit 233 acquires various measured temperatures obtained with the use of an actual machine or a sample implementation of the mobile terminal 100. The measured temperatures may be input to the design device 200 by the user of the design device 200. Alternatively, the measured temperatures may be acquired directly from the actual machine or sample implementation of the mobile terminal 100, which is connected to the design device 200.

Using the various measured temperatures acquired by the temperature data acquiring unit 233, the transfer function generating unit 234 determines values of the intermediate parameters appearing in the transfer functions by fitting procedures employing, for example, the least-squares method. The transfer function generating unit 234 stores the calculated values of the intermediate parameters in the intermediate parameter storing unit 231. Then, the transfer function generating unit 234 derives, from the values of the intermediate parameters, values of the parameters appearing in the estimation equations used to estimate the surface temperature. The transfer function generating unit 234 stores the calculated values of the parameters in the parameter storing unit 232. Note that one or two or more locations for estimating the surface temperature are designated by the user of the design device 200.

Figure 17:
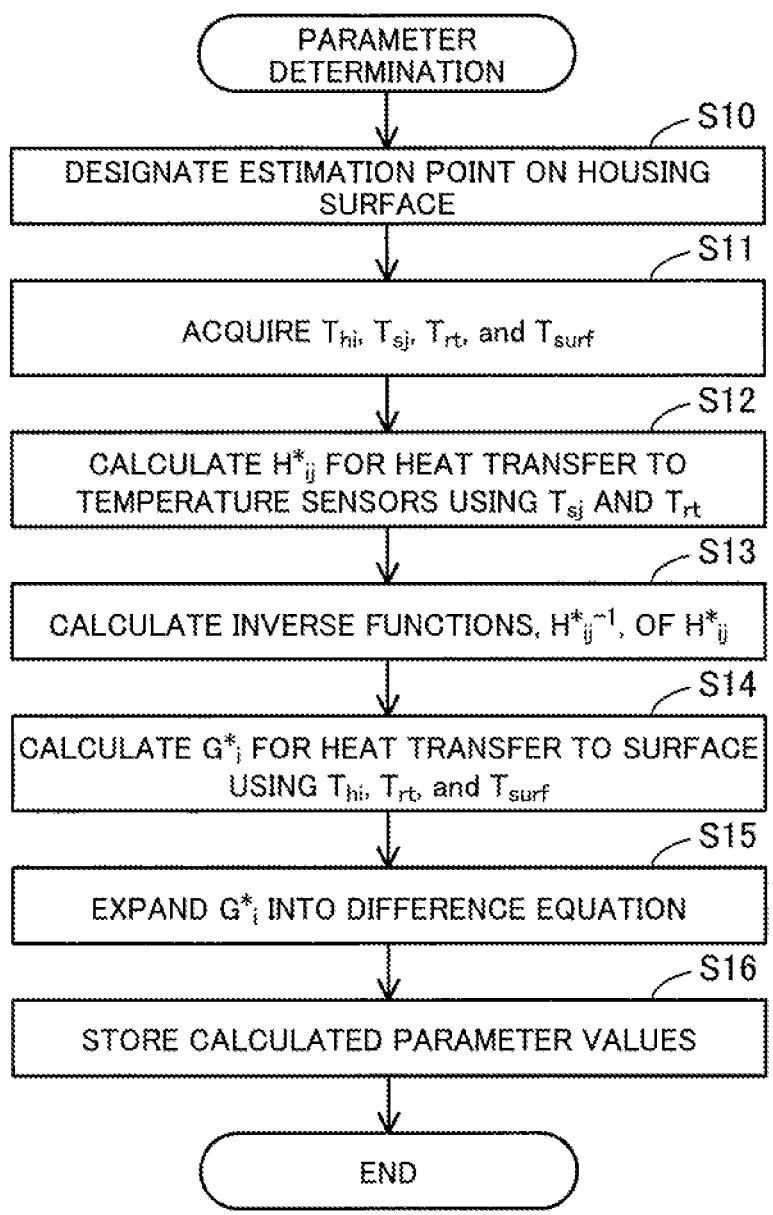
FIG. 17 is a flowchart illustrating an example of a parameter determination procedure.

FIG. 17 is a flowchart illustrating an example of a parameter determination procedure.

(Step S10) The transfer function generating unit 234 receives, from the user of the design device 200, designation of one or two or more locations on the surface of the housing 101, used to estimate the surface temperature (i.e., one or two or more estimation points).

(Step S11) The temperature data acquiring unit 233 acquires the heat source temperatures $T_{hi}(t)$, the measured temperatures $T_{sj}(t)$ detected by the temperature sensors individually disposed near the corresponding heat source, the reference point temperature $T_{rt}(t)$, and the surface temperature at the designated estimation point $T_{surf}(t)$. In this regard, each of the heat sources is caused to operate solely to thereby obtain the above-cited various temperatures in chronological order.

(Step S12) Using the measured temperatures $T_{sj}(t)$ and the reference point temperature $T_{rt}(t)$, the transfer function generating unit 234 calculates the transfer functions for heat transfer from the plurality of heat sources to the plurality of temperature sensors, $H^*_{ij}=h_{ij}$. The transfer functions $H^*_{ij}=h_{ij}$ are calculated in the time domain according to Expression (15) above. That is, the transfer function generating unit 234 calculates the difference between the measured temperature $T_{sj}(t)$ and the reference point temperature $T_{rt}(t)$ with respect to each of the temperature sensors, and obtains the heat transfer coefficients $h_{ij}$ giving the minimum error for the plurality of temperature sensors.

(Step S13) The transfer function generating unit 234 calculates the inverse functions $H^{*-1}_{ij}=h^*_{ij}$ of the transfer functions $H^*_{ij}=h_{ij}$. The inverse functions are calculated from $h_{ij}$ according to Expression (13) above.

(Step S14) Using the heat source temperatures $T_{hi}(t)$, the reference point temperature $T_{rt}(t)$, and the surface temperature $T_{surf}(t)$, the transfer function generating unit 234 calculates the transfer functions $G^*_i(s)$ representing heat transfer from the plurality of heat sources to the estimation point on the housing surface. That is, the transfer function generating unit 234 determines the heat transfer coefficients $g_i$ and the thermal time constants $\tau_{hi}$, $\tau_{g1i}$, and $\tau_{g2i}$ included in the transfer functions $G^*_i(s)$. The transfer functions $G^*_i(s)$ are calculated by fitting procedures employing, for example, the least-squares method in the frequency domain according to Expression (16) above. That is, the transfer function generating unit 234 calculates the difference between the heat source temperature $T_{hi}(t)$ and the reference point temperature $T_{rt}(t)$ for each of the heat sources, and takes the Laplace transform of the difference. The transfer function generating unit 234 calculates the difference between the surface temperature $T_{surf}(t)$ and the reference point temperature $T_{rt}(t)$, and takes the Laplace transform of the difference. The transfer function generating unit 234 obtains the heat transfer coefficients $g_i$ and the thermal time constants $\tau_{hi}$, $\tau_{g1i}$, and $\tau_{g2i}$ giving the minimum error for Expression (16).

(Step S15) The transfer function generating unit 234 expands each of the transfer functions $G^*_i(s)$ into a difference equation. That is, based on the heat transfer coefficients $g_i$ and the thermal time constants $\tau_{hi}$, $\tau_{g1i}$, and $\tau_{g2i}$, the transfer function generating unit 234 obtains $a_{0i}$, $a_{1i}$, $a_{21}$, $b_{1i}$, and $b_{21}$ of Expression (20) above.

(Step S16) The transfer function generating unit 234 registers, in the parameter table 42, the values of $h^*_{ij}$ calculated in step S13. In addition, the transfer function generating unit 234 registers, in the parameter table 42, the values of $a_{0i}$, $a_{1i}$, $a_{21}$, $b_{1i}$, and $b_{21}$ calculated in step S15.

Figure 18:
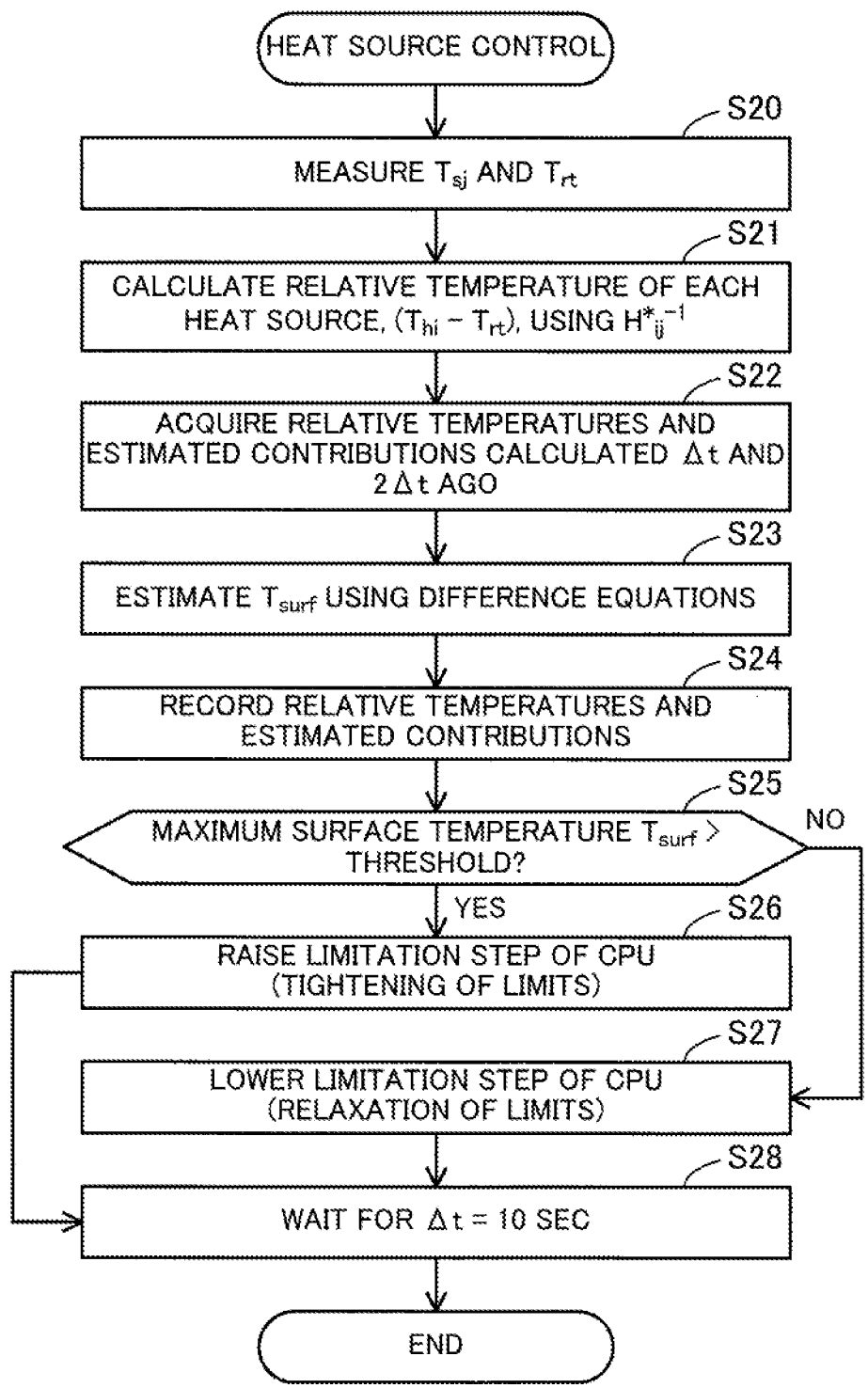
FIG. 18 is a flowchart illustrating an example of a heat source control procedure.

FIG. 18 is a flowchart illustrating an example of a heat source control procedure.

(Step S20) The temperature measuring unit 133 acquires the measured temperatures $T_{sj}(t)$ detected by the temperature sensors 122a, 122b, and 122c individually disposed near the corresponding heat source. In addition, the temperature measuring unit 133 acquires the reference point temperature $T_{rt}(t)$ measured by the temperature sensor 122d.

(Step S21) Using the measured temperatures $T_{sj}(t)$, the reference point temperature $T_{rt}(t)$, and the inverse functions $H^{*-1}_{ij}=h^*_{ij}$ of the transfer functions $H^*_{ij}$, the surface temperature estimating unit 134 calculates the relative temperatures of the heat sources, $T_{hi}(t)-T_{rt}(t)$. The relative temperatures of the heat sources are calculated in the time domain according to Expression (17) above, using the values of $h^*_{ij}$ registered in the parameter table 42. That is, the surface temperature estimating unit 134 calculates, for each of the temperature sensors, the difference between the measured temperature $T_{sj}(t)$ of the temperature sensor and the reference point temperature $T_{rt}(t)$, and obtains $T_{hi}(t)-T_{rt}(t)$ by a product-sum operation using $h^*_{ij}$.

(Step S22) The surface temperature estimating unit 134 reads previous data from the previous data table 43. That is, the surface temperature estimating unit 134 reads, for each of the heat sources, the relative temperature (i.e., the difference between the heat source temperature and the reference point temperature) calculated the time $\Delta t$ ago and the relative temperature calculated the time $2\Delta t$ ago. In addition, the surface temperature estimating unit 134 reads, for each of the heat sources, the estimated contribution to the housing surface calculated the time $\Delta t$ ago and the estimated contribution to the housing surface calculated the time $2\Delta t$ ago.

(Step S23) The surface temperature estimating unit 134 estimates, using difference equations, the surface temperature $T_{surf}(t)$ from the relative temperatures $T_{hi}(t)-T_{rt}(t)$ of the heat sources calculated in step S21. The surface temperature $T_{surf}(t)$ is calculated according to Expression (18) above. That is, according to Expression (19) above, the surface temperature estimating unit 134 calculates, for each of the heat sources, the estimated contribution as of time t, $T_{surf-i}(t)$ from the relative temperature as of time t calculated in step S21 and the previous data read in step S22. In this regard, the surface temperature estimating unit 134 uses the values of $a_{0i}$, $a_{1i}$, $a_{2i}$, $b_{1i}$, and $b_{2i}$ registered in the parameter table 42. Then, the surface temperature estimating unit 134 adds the estimated contributions $T_{surf-i}(t)$ of the individual heat sources to the reference point temperature as of time t, $T_{rt}(t)$, to thereby calculate the surface temperature $T_{surf}(t)$.

(Step S24) The surface temperature estimating unit 134 records, in the previous data table 43, the relative temperatures of the individual heat sources calculated in step S21 as the relative temperatures calculated the time $\Delta t$ ago. In addition, the surface temperature estimating unit 134 records, in the previous data table 43, the estimated contributions of the individual heat sources calculated in step S23 as the estimated contributions calculated the time $\Delta t$ ago. The surface temperature estimating unit 134 also records, in the previous data table 43, the relative temperatures and estimated contributions calculated the time $\Delta t$ ago which are read in step S22 as the relative temperatures and estimated contributions calculated the time $2\Delta t$ ago. In the case where two or more estimation points for estimating the surface temperature have been designated, steps S22 to S24 above are performed with respect to each of the estimation points.

(Step S25) If, in step S23, the surface temperature is estimated for two or more estimation points, the heat source control unit 135 selects the maximum surface temperature. The heat source control unit 135 compares the estimated or selected surface temperature $T_{surf}(t)$ with a predetermined threshold to determine whether $T_{surf}(t)$ exceeds the threshold. If $T_{surf}(t)$ exceeds the threshold, the process moves to step S26. If not, the process moves to step S27. In the following description, the case of controlling the CPU 111*a*, which is one of the heat sources, is explained as an example. The heat source control unit 135 may control other heat sources such as the charging circuit 124 and the power amplifier 114*a*.

(Step S26) The heat source control unit 135 raises the limitation step of the CPU 111*a* by one to thereby impose greater limits on the operation speed of the CPU 111*a*. This reduces the clock frequency of the CPU 111*a*, which in turn reduces the amount of heat generation. Note however that, if the limitation step is already set to its maximum level, the heat source control unit 135 does not change the limitation step. In this case, the heat source control unit 135 may lower the operating level of a different heat source instead. Then, the process moves to step S28.

(Step S27) The heat source control unit 135 lowers the limitation step of the CPU 111*a* by one to thereby relax limits on the operation speed of the CPU 111*a*. This increases the clock frequency of the CPU 111*a*, which in turn may increase the amount of heat generation. Note however that, if the limitation step is already set to its minimum level, the heat source control unit 135 does not change the limitation step.

(Step S28) The temperature measuring unit 133 and the surface temperature estimating unit 134 wait for the time $\Delta t$ (for example, 10 seconds). After the time $\Delta t$ has elapsed, the process restarts from step S20.

Next described is a modification of the second embodiment. In Expression (15) above, nine heat transfer coefficients $h_{11}$, $h_{12}$, $h_{13}$, $h_{21}$, $h_{22}$, $h_{23}$, $h_{31}$, $h_{32}$, and $h_{33}$ are employed to represent heat transfer over the substrate 102 from the three heat sources to the three temperature sensors. On the other hand, if the locations of the three temperature sensors satisfy a predetermined condition, the heat transfer coefficients may be reduced to four, $h_{11}$, $h_{12}$, $h_{13}$, and $h_{23}$, as given in the following Expression (21), to obtain an approximate solution. This reduces computational load of the parameter determination.

$$\begin{bmatrix} h_{11} & h_{12} & h_{13} \\ h_{21} & h_{22} & h_{23} \\ h_{31} & h_{32} & h_{33} \end{bmatrix} \approx \begin{bmatrix} h_{11} & h_{12} & h_{13} \\ h_{12} & h_{11} & h_{23} \\ h_{13} & h_{23} & h_{11} \end{bmatrix} \qquad (21)$$

The condition that needs to be satisfied is that each of the plurality of temperature sensors is disposed sufficiently close to its corresponding heat source. Specifically, the requirement is that the temperature sensor 122*a* is disposed sufficiently close to the CPU 111*a*, the temperature sensor 122*b* is disposed sufficiently close to the charging circuit 124, and the temperature sensor 122*c* is disposed sufficiently close to the power amplifier 114*a*. In this case, because the distance between the temperature sensor 122*b* and the charging circuit 124 is sufficiently small and the distance between the temperature sensor 122*c* and the power amplifier 114*a* is sufficiently small, the values of $h_{22}$ and $h_{33}$ become very close to that of $h_{11}$. As a result, $h_{11}$ is used in place of $h_{22}$ and $h_{33}$.

In addition, the thermal path between the CPU 111*a* and the temperature sensor 122*b* largely conforms to the thermal path between the charging circuit 124 and the temperature sensor 122*a*, except for the direction. Therefore, the value of the heat transfer coefficient $h_{21}$ becomes very close to that of $h_{12}$, and $h_{12}$ is thus used in place of $h_{21}$. In like fashion, the value of the heat transfer coefficient $h_{31}$ becomes very close to that of $h_{13}$, and $h_{13}$ is thus used in place of $h_{31}$. The value of the heat transfer coefficient $h_{32}$ becomes very close to that of $h_{23}$, and $h_{23}$ is thus used in place of $h_{32}$. In consequence, only four heat transfer coefficients need to be calculated.

Figure 19:
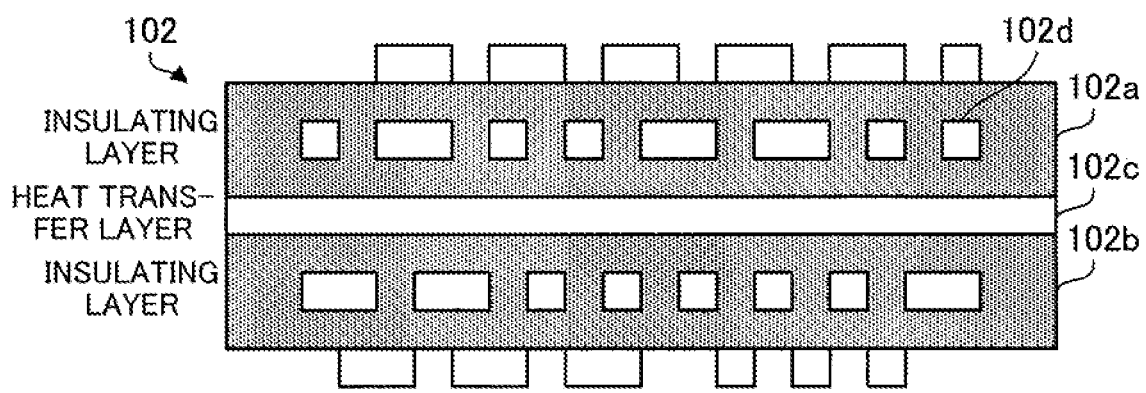
FIG. 19 illustrates a structural example of a substrate of the mobile terminal.

A structural example of the substrate 102 is described next as another modification. FIG. 19 illustrates a structural example of the substrate of the mobile terminal. The second embodiment utilizes the property in which thermal time constants associated with the substrate 102 take small values because wires with low thermal resistance (e.g. copper wires) are installed in the substrate 102. In this regard, the substrate 102 may be configured in such a manner as to further lower the numerical values of the thermal time constants associated with the substrate 102.

For example, the substrate 102 includes insulating layers 102*a* and 102*b*, a heat transfer layer 102*c*, and wires 102*d*. Various components are disposed on the surface of at least one of the insulating layers 102*a* and 102*b*. The heat transfer layer 102*c* is provided between the insulating layers 102*a* and 102b. The heat transfer layer 102c is made of a material having high thermal conductivity and low thermal resistance, such as copper. The wires 102d are embedded in the insulating layer 102a.

Thus, providing the heat transfer layer 102c in the substrate 102 separately from the wires 102d further lowers the numerical values of the thermal time constants associated with the substrate 102. This increases the accuracy of estimating the heat source temperatures from the measured temperatures of the temperature sensors 122a, 122b, and 122c, which in turn increases the accuracy of estimating the surface temperature. In addition, heat dissipation of the substrate 102 is increased, which prevents the surface temperature from rising rapidly. Note that one heat transfer layer is formed in the substrate 102 according to the example of FIG. 19; however, two or more heat transfer layers may be provided in the substrate 102. In addition, according to the example of FIG. 19, the heat transfer layer 102c is embedded in the substrate 102; however, it may be disposed on the surface of the substrate 102.

According to the mobile terminal 100 and the design device 200 of the second embodiment, transfer functions not including the thermal time constants representing the transient responses of heat transfer over the substrate 102 are used to estimate the heat source temperatures of the plurality of heat sources from the measured temperatures of the temperature sensors 122a, 122b, and 122c. Then, transfer functions including the thermal time constants representing the transient responses of heat transfer over the substrate 102 as well as the thermal time constants representing the transient responses of heat transfer from the plurality of heat sources to the housing surface are used to estimate the surface temperature of the housing 101 from the estimated heat source temperatures.

Herewith, it is possible to reduce the computational effort needed to estimate the heat source temperatures of the plurality of heat sources. The reduction in the computational effort allows a reduction in the time needed to estimate the surface temperature, which leads to a reduction in the cycle period of estimating the surface temperature. As a result, it is possible to obtain the latest surface temperature in a timely fashion, which contributes to improving the accuracy of controlling the heat sources. In addition, it is possible to reduce the number of parameters by disposing each of the temperature sensors 122a, 122b, and 122c sufficiently close to its corresponding heat source. Further, the provision of the heat transfer layer 102c in the substrate 102 not only increases the heat dissipation of the substrate 102 but also improves the accuracy of estimating the surface temperature.

Note that the information processing of the first embodiment is implemented by causing the electronic device to execute a program, as described above. Also, the information processing of the second embodiment is implemented by causing the mobile terminal 100 and the design device 200 to execute a program. Such a program may be recorded in a computer-readable storage medium (for example, the storage medium 120a or 223). Examples of such a computer-readable storage medium include a magnetic disk, an optical disk, a magneto-optical disk, and semiconductor memory. Examples of the magnetic disk are a FD and a HDD. Examples of the optical disk are a compact disc (CD), CD-recordable (CD-R), CD-rewritable (CD-RW), DVD, DVD-R, and DVD-RW. The program may be recorded on portable storage media and then distributed. In such a case, the program may be executed after being copied from such a portable storage medium to a different storage medium (for example, the non-volatile memory 113 or the HDD 213).

According to one aspect, it is possible to reduce computational effort needed to estimate the surface temperature.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An electronic apparatus comprising:
a housing;
a substrate disposed inside the housing;
a plurality of temperature sensors disposed on the substrate; and
a processor configured to perform a procedure including:
calculating heat source temperatures of a plurality of heat sources disposed on the substrate from measured temperatures measured by the temperature sensors, by using a first heat transfer model that assumes a steady state of heat transfer from the heat sources to the temperature sensors,
calculating a surface temperature of a surface of the housing from the heat source temperatures calculated by the first heat transfer model, by using a second heat transfer model including a first parameter representing a transient response of heat transfer from the heat sources to the temperature sensors and a second parameter representing a transient response of heat transfer from the heat sources to the surface, and
controlling at least part of operations of the heat sources, based on the calculated surface temperature;
wherein the first heat transfer model includes a first polynomial for calculating the heat source temperatures from the measured temperatures; and
the second heat transfer model includes a second polynomial for calculating the surface temperature from the heat source temperatures calculated by the first heat transfer model, calculation results of previous heat source temperatures, and calculation results of a previous surface temperature.

2. The electronic apparatus according to claim 1, wherein:
the first parameter is a time constant representing response speed that indicates how fast changes in the heat source temperatures are reflected in the measured temperatures; and
the second parameter is a time constant representing response speed that indicates how fast the changes in the heat source temperatures are reflected in the surface temperature.

3. The electronic apparatus according to claim 1, wherein:
the calculating of the surface temperature includes calculating, for a plurality of locations on the surface, a plurality of surface temperatures by using different second heat transfer models; and
the controlling is performed based on a maximum surface temperature amongst the calculated surface temperatures.

4. A surface temperature calculation method comprising:
acquiring, by a processor, measured temperatures measured by a plurality of temperature sensors disposed on a substrate provided inside a housing of an electronic apparatus;
calculating, by the processor, heat source temperatures of a plurality of heat sources disposed on the substrate from the measured temperatures by using a first heat transfer model that assumes a steady state of heat transfer from the heat sources to the temperature sensors;
calculating, by the processor, a surface temperature of a surface of the housing from the heat source temperatures calculated by the first heat transfer model, by using a second heat transfer model including a first parameter representing a transient response of heat transfer from the heat sources to the temperature sensors and a second parameter representing a transient response of heat transfer from the heat sources to the surface; and
controlling, by the processor, at least part of operations of the heat sources, based on the calculated surface temperature;
wherein the first heat transfer model includes a first polynomial for calculating the heat source temperatures from the measured temperatures; and
the second heat transfer model includes a second polynomial for calculating the surface temperature from the heat source temperatures calculated by the first heat transfer model, calculation results of previous heat source temperatures, and calculation results of a previous surface temperature.

5. A non-transitory computer-readable storage medium storing a computer program that causes a computer to perform a procedure comprising:
acquiring measured temperatures measured by a plurality of temperature sensors disposed on a substrate provided inside a housing of an electronic apparatus;
calculating heat source temperatures of a plurality of heat sources disposed on the substrate from the measured temperatures by using a first heat transfer model that assumes a steady state of heat transfer from the heat sources to the temperature sensors;
calculating a surface temperature of a surface of the housing from the heat source temperatures calculated by the first heat transfer model, by using a second heat transfer model including a first parameter representing a transient response of heat transfer from the heat sources to the temperature sensors and a second parameter representing a transient response of heat transfer from the heat sources to the surface; and
controlling at least part of operations of the heat sources, based on the calculated surface temperature;
wherein the first heat transfer model includes a first polynomial for calculating the heat source temperatures from the measured temperatures; and
the second heat transfer model includes a second polynomial for calculating the surface temperature from the heat source temperatures calculated by the first heat transfer model, calculation results of previous heat source temperatures, and calculation results of a previous surface temperature.

* * * * *